United States Patent
Shrivastava et al.

(10) Patent No.: US 12,232,038 B2
(45) Date of Patent: Feb. 18, 2025

(54) METHOD AND SYSTEM FOR PERFORMING RADIO RESOURCE MANAGEMENT (RRM) MEASUREMENTS BY A WTRU IN A 3GPP NETWORKS

(71) Applicant: SAMSUNG ELECTRONICS CO., LTD., Suwon-si (KR)

(72) Inventors: Vinay Kumar Shrivastava, India (IN); Avijit Manna, India (KR); Kalyan Dhulipudi, India (KR); Ankit Dhabriya, India (IN); Ankit Srivastav, India (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 446 days.

(21) Appl. No.: 17/597,388

(22) PCT Filed: Aug. 3, 2020

(86) PCT No.: PCT/KR2020/010222
§ 371 (c)(1),
(2) Date: Jan. 4, 2022

(87) PCT Pub. No.: WO2021/020952
PCT Pub. Date: Feb. 4, 2021

(65) Prior Publication Data
US 2022/0279445 A1    Sep. 1, 2022

(30) Foreign Application Priority Data
Aug. 1, 2019   (IN) .............................. 2019 41031213

(51) Int. Cl.
*H04W 52/02*    (2009.01)
*H04W 36/32*    (2009.01)
*H04W 36/30*    (2009.01)

(52) U.S. Cl.
CPC .... *H04W 52/0232* (2013.01); *H04W 52/0235* (2013.01); *H04W 52/0245* (2013.01);
(Continued)

(58) Field of Classification Search
CPC ......... H04W 52/0232; H04W 52/0235; H04W 52/0245; H04W 52/0254; H04W 52/0274;
(Continued)

(56) References Cited

U.S. PATENT DOCUMENTS 9,723,507 B2    8/2017  Edara
2009/0222654 A1  9/2009  Hum et al.
(Continued)

FOREIGN PATENT DOCUMENTS

WO   WO 2014/005116    1/2014
WO   WO 2018084620    5/2018
(Continued)

OTHER PUBLICATIONS

CATT, UE Power saving scheme for RRM measurements, R1-1902026, 3GPP TSG RAN WG1 Meeting #96, Athens, Greece, Feb. 16, 2019 pp. 2-7; and figure 1.
(Continued)

*Primary Examiner* — Robert C Scheibel
(74) *Attorney, Agent, or Firm* — F. CHAU & ASSOCIATES, LLC

(57) ABSTRACT

The present subject matter describes performing radio resource management (RRM) measurements by a WTRU in a 3GPP networks. The method comprise defining at-least one of: a) a channel condition threshold, b) a WTRU mobility threshold, and c) a measurement-reliability threshold. A first sub-set of reference-signal samples are measured out of a set of reference-signal samples based on sensing at least one of current channel conditions and mobility-conditions. A reliability-parameter associated with the first sub-set
(Continued)

of measured samples is checked. Finally, network-measurement operation is concluded in case of the reliability-parameter being in accordance with the pre-defined reliability-thresholds.

10 Claims, 21 Drawing Sheets

(52) U.S. Cl.
CPC ... *H04W 52/0254* (2013.01); *H04W 52/0274* (2013.01); *H04W 36/304* (2023.05); *H04W 36/324* (2023.05)

(58) Field of Classification Search
CPC . H04W 36/32; H04W 36/0085; H04W 24/08; Y02D 30/70
See application file for complete search history.

(56) References Cited

U.S. PATENT DOCUMENTS

| | | |
|---|---|---|
| 2017/0026865 A1 | 1/2017 | Behravan et al. |
| 2019/0215888 A1 | 7/2019 | Cirik et al. |
| 2019/0281525 A1 | 9/2019 | Lee et al. |
| 2019/0320490 A1* | 10/2019 | Liu .................. H04W 52/0229 |
| 2020/0374780 A1* | 11/2020 | Shan ................ H04W 52/0235 |
| 2020/0413340 A1* | 12/2020 | Nam .................... H04W 24/10 |
| 2021/0321446 A1* | 10/2021 | Lee ....................... H04W 72/54 |
| 2022/0124622 A1* | 4/2022 | Islam .................. H04W 72/542 |
| 2022/0131596 A1* | 4/2022 | Sharma ................ H04B 7/0888 |

FOREIGN PATENT DOCUMENTS

| | | |
|---|---|---|
| WO | WO 2019/063336 | 4/2019 |
| WO | WO 2020/034608 | 2/2020 |

OTHER PUBLICATIONS

Nokia et al., CSI-RS and CSI-RS based L3 Mobility, R4-1805264, 3GPP TSG-RAN WG4 Meeting #86bis, Melbourne, Australia, Apr. 6, 2018 pp. 1-3.

3GPP TR 38.840 v2.0.0; 3GPP; TSG & RAN; NR; Study on UE power saving, Rel. 16, R1-1907967, May 29, 2019 pp. 5-9, 39-70; tables 1, 15, 18-19; and figure 1.

Ericsson, Relaxed RRA measurements in RRC_Connected mode, R2-1906613, 3GPP TSG-RAN2 Meeting #106, Reno, USA, May 3, 2019 pp. 1, 5.

Samsung, UE power consumption reduction in RRM measurement, R1-1902319, 3GPP TSG RAN WG1 Meeting #96, Athens, GR, Feb. 15, 2019 pp. 1-3.

CATT, Summary of UE Power Saving Schemes, R1-1903737, 3GPP TSG RAN WG1 #96, Athens, Greece, Mar. 3, 2019 pp. 15-17; and table 10.

* cited by examiner

FIG. 4C

CDRX configuration:
15:15:31.803 15:15:32.254334 ST1 LTE RRC DL_DCCH
rrcConnectionReconfiguration
drx-Config: setup (1)
setup
drx-onDurationTimer: milliSeconds (1)
milliSeconds: ms10 (7)
drx-InactivityTimer: ms100 (15)
drx-SlotOffset: 0 ms (0)

SMTC configuration:
measConfig
measObjectToAddModList: 1 item
Item 0
MeasObjectToAddMod
measObjectId: 1
smtc1
sf20: 1
periodicityAndOffset: sf20 (2)
duration: sf1 (0)

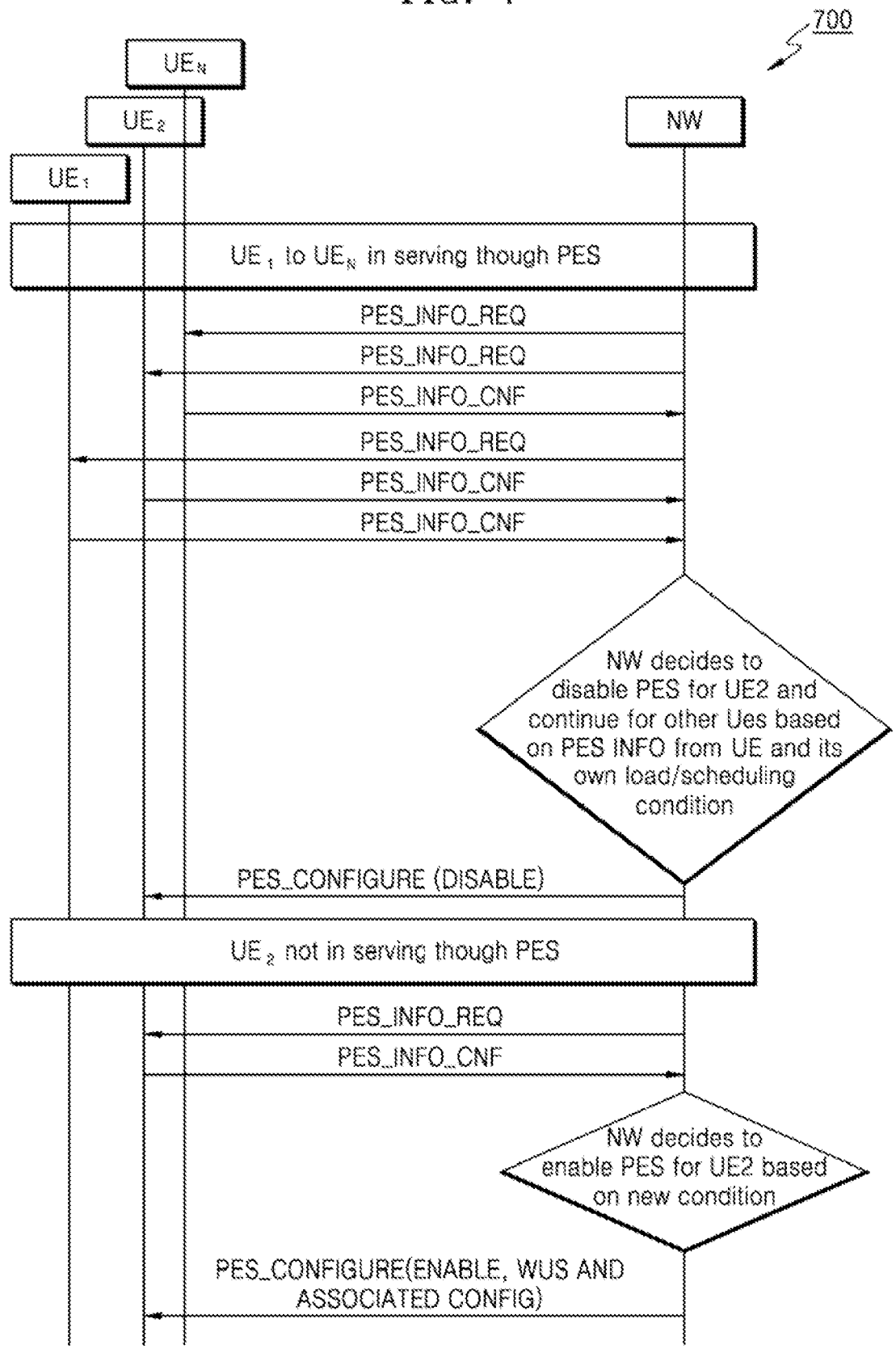

METHOD AND SYSTEM FOR PERFORMING RADIO RESOURCE MANAGEMENT (RRM) MEASUREMENTS BY A WTRU IN A 3GPP NETWORKS

TECHNICAL FIELD

The present disclosure relates to wireless communication and more particularly, relates to methods and systems for energy efficient and performance-optimized mobility measurements in 3GPP networks such as 5G New Radio (NR).

DISCUSSION OF THE RELATED ART

In the recent years, a significant growth and development has been witnessed in the realm of telecommunication. Energy efficiency has always been one of the prominent factors driving this development over the years. Even today, in the era of 5G New Radio (NR) systems, energy efficiency is of paramount-importance to enable effective functioning of diverse devices and service use cases.

Energy efficiency is of paramount importance to enable effective functioning of diverse devices and services. One of the major-sources of power consumption is measurement operation, such as mobility measurements. For instance, the mobility measurement, such as idle mode measurements of serving and neighbouring cells, may be implemented for performing cell selection/reselection and/or mobility measurements of serving and neighbouring cells in connected mode of a User Equipment (UE) to perform handover from one radio cell to another.

One of the biggest challenges with User Equipment (UE) mobility measurements is power consumption, for example, owing to the fact that the UE stays awake during the measurement. Moreover, alignment of Discontinuous Reception (DRX) and measurement resource occurrence is also not guaranteed from network configuration. This result into further-prolonging of awake duration of the UE.

There lies at-least a need for enhancing energy efficiency for the measurement operations as well as address problems associated with extensive measurements of beams/cells/frequencies and misalignment of the measurement resources and the DRX ON duration.

5G-NR (Fifth Generation mobile communication—New Radio) has been built over short-range dense small cells network, milli-meter wave (mmWave) based beam-forming prone to high propagation losses and human/object blocking, ultra-lean design principle with provision for only on-demand measurement reference signals. Consequently, the same poses challenging requirements for measurements implementation in order to maintain the communication link intact, and to ensure seamless data connectivity. Concurrently, achieving energy efficiency and performance optimization for measurements in multi-GBPS throughput scenarios for 5G aggravates the problem-in-hand.

Generally, across different wireless communication technologies ranging from 2G (Second Generation) to most recent 5G, UE performs primarily two different kinds of measurements. First type of measurement is termed as Tracking and Control Measurement (TCM), which involves measurement for control, synchronization and tuning of UE's own characteristic operational parameters, for example, Automatic Gain Control (AGC) for maintaining the received baseband signal strength in acceptable dynamic range, Automatic Frequency Control (AFC) for retaining the frequency synchronization of the received signal and overcoming the deviations arising from different time-variant factors like oscillator drifts and mobility induced Doppler, and Symbol Time Recovery (STR) to achieve symbol timing synchronization. Second category of measurement is generally specified as Mobility Management Measurement (MMM), which particularly involves measurement for maintaining and sustaining the link as the UE moves across the different radio coverage regions or cells.

Typically, UE is configured with neighbour cells by the network so that it may perform regular synchronous/asynchronous measurement of the serving and neighbour-cells and indicate the same to the network in order to assist the network to take correct decision of keeping the UE with present cell or moving the UE into a more desirable cell as part of mobility management. The network transmits cell-specific known signals (Reference Signals—RS) to facilitate the UE for such measurement. With advancement of wireless technology, as the throughput and mobility requirement change, such known signals are also varied based on respective air-interface characteristics.

In the legacy system, for example, 2G or 3G, such signals are transmitted periodically as "always present" signal on the channel as an aid to the UE. In Fourth Generation Long Term Evolution (4G LTE) wireless communication system also, there are periodic and always-on RS, termed as Cell Specific Reference Signal (CRS) as introduced in Release 8 of LTE. However, with evolution of LTE, the density of the RS over the bandwidth became limiting factors with the increase of supported spatial dimensions (up to 8 in Release 10) and is required to be reduced to improve the spectral efficiency of the system. This led to UE specific reference signal also known as Demodulation Reference Signal (DMRS) for coherent demodulation of the channel and Channel State Indication Reference Signal (CSIRS) for the purpose of measurement and link adaptation. The spectral efficient advantage of UE specific reference signal emanates from the intrinsic behaviour of limiting the reference signal to the allocated resources for the specific UE, unlike the entire bandwidth and time resources as in CRS. In 5G, RS are made on-demand in order to further improve spectral efficiency. Consequently, this imposes certain complex restrictions and challenges from the UE implementation point of view.

In 5G network, UE performs measurement of the Synchronization Signal Block (SSB) and UE specific Channel State Information (CSI) Reference Signals (RS) based on network configuration. SSB is 4 OFDM symbols long combined Primary Synchronization Signal (PSS), Secondary Synchronization Signal (SSS), and Physical Broadcast Channel (PBCH). Measurement operation involves extracting RS from FFT based time-domain Rx sample buffers, descrambling, differential correlation and linear averaging to estimate Reference Signal Received Power (RSRP) and further derive, Receive Strength Signal Indicator (RSSI), quality of the received signal (RSRQ), and "Signal to Interference Noise Ratio (SINR)". Best set of results across measured beams and cells are sorted and filtered that provides basis of decision to perform cell reselection & handover in idle/connected modes.

UE uses same set of RSs for TCM operations, however, hardware configuration and processing is different for different type of measurement. As an indicative example, raw received power is extracted from the RS and is used to calculate gain for AGC operation. Whereas, frequency offset is determined (AFC) and Doppler fading in the channel (Correlation Time Estimator, CTE) is calculated based on the I/Q samples correlation values extracted from the RS. On the contrary, Symbol time correction values (STR) are derived from power delay profile of multipath received signal RS power. Further, beam management operation requires beam measurement and tracking to align the UE with the best pair of Tx-Rx beams. In specific scenarios of degrading channel conditions or blockage, this needs to be very rapidly monitored and best beam needs to be reported to the network to avoid the situation of beam failure.

Due to the bursty nature of the traffic, it is unnecessary for the UE to keep the Radio Frequency (RF) circuitry at ON state when there is no traffic. In order to improve energy efficiency of the UE, legacy system applies Discontinuous Reception mechanism or DRX. With this mechanism, when there is no data UE power down its RF module to reduce power consumption (SLEEP-duration). After each SLEEP-duration, UE powers-ON the RF module and receives control and/or data packets, if present, and continue to keep the RF at power-ON state till control and/or data is available (ON-duration). The possible values for SLEEP-duration and ON-duration are configured by the network. When the UE is in SLEEP-duration, it may lose the synchronization with the NW in terms of both frequency/time as well as the power gain it has to apply. Therefore, before moving to ON-duration, the UE has to perform TCM measurements to adjust AGC/AFC/STR synchronization. The UE also consistently performs mobility measurements, which adds to the awake-time of the UE.

At least a challenge with the measurements is the power consumption involved, as UE stays awake during measurement. Alignment of Discontinuous Reception (DRX) and measurement resource occurrence is not guaranteed from network configuration that further prolongs the awake duration. Adding independent wake up radio hardware (HW) to monitor narrowband signal sequence is a solution to this problem, however, it comes at the cost of HW complexity. Another challenge is to achieve performance efficiency in realizing mmWave measurement operation within UE implementation along with meeting 20 GBPS of peak data rates and stringent latency requirements for 5G NR.

In idle mode of UE, measurement operation contributes to the major share of power consumption for UE whereas in connected mode apart from data transmission, major share of power is consumed due to measurements. Further, power consumption of UEs is affected by the Connected Mode Discontinuous Reception (CDRX) operation of the UE. During DRX sleep, the UE remain in sleep mode to reduce power consumption. However, in CDRX ON-duration, the UE shifts from sleep mode to wake up mode which results in tracking (e.g. Phase Tracking, Automatic Gain Control (AGC), Automatic Frequency Control (AFC), Symbol Time Reference (STR)) un-synchronization). Owing to shifting from sleep mode to wake up mode, the UE requires additional measurement resources and time to perform AGC tuning with measurements and regular mobility measurements. Thereby, awake duration of the UE is increased which leads to higher power consumption. Same issue can also be applicable to dual SIM dual standby (DSDS) scenario with large-gaps. While LTE can use heavy duty wideband always present CRS based resources for early measurement (during waking up), NR has no such facility.

Furthermore, performing measurements for large number of beams/cells/frequencies requires higher power consumption for the UE. This is inherently a bigger requirement in 5G due to more beams, small cell size and FR1/FR2 frequencies. 3GPP Rel16/17 UE power saving WI is working on standardization of certain aspects for RRM measurement reduction, while many aspects relate to UE specific implementations. Also, measurement design does not consider the QoS requirements of active services.

Additionally, misalignment of measurement resources and DRX ON duration of the UE further aggravates power consumption of the UE. Generally, SMTC (SSB Measurement Timing Configuration) window is cell specific configuration, whereas DRX configuration for connected mode UE is UE specific. In other words, measurement resources are cell-specific SMTC governed/UE dedicated CSIRS resources. Owing to such configurations, a misalignment may occur in terms of timing of the measurement occasion, i.e., timing gap between measurement and DRX ON duration performed by the UE. Consequently, the UE may need to extend awake-duration beyond normal DRX ON duration, which may lead to excessive power consumption.

Further, there always remains an extra load on UE power consumption due to WUS monitoring. Monitoring WUS is meant to reduce UE power consumption by skipping unnecessary control channel monitoring when there is no data to be exchanged due to the bursty nature of the traffic. However, monitoring WUS adds some extra load on UE in relation with power consumption. Depending on service traffic pattern and network data resource scheduling, the presence of control-channel indicating data resource allocation can be every DRX cycle in some cases and can be scarce in some other cases. In a situation when resource allocation is almost at every DRX cycle, it is unnecessary burden to the UE to monitor WUS along with control channel every DRX cycle. Moreover, unnecessary WUS transmission leads to overall Band Width (BW) loss for the NW.

Further, the conventional mechanisms remain subject to measurement-realization and performance-optimization issues. Performance of mobile processor platforms is evaluated in terms of MIPS such that optimized solutions always target lesser MIPS. At least a requirement with onset of 5G has emerged for meeting FR1 (Frequency Range 1) & FR2 (Frequency Range 2) measurements and beam-forming operations.

A UE processor regularly performs various measurement activities primarily MMPM and PCM. As part of MMPM, apart from regular mobility measurement on serving cell and neighbour cells, a FR2 supported UE needs to perform regular beam measurement for beam tracking and beam sweeping purpose. This imposes a requirement of different beam setting to be configured to the HW at specific-time positions (slot and symbol index) along with the beam index which in turn increases the processing load of calculating slot configuration within reduced slot duration for higher frequency. For FR2, slot duration reduces as low as 125 µs with higher SCS (sub-carrier spacing) of 120 KHz. This, in turn, implies completion of UE operations including all aforementioned activities within reduced slot duration. This becomes inevitable performance challenge to realize a commercial UE solution.

SUMMARY

Embodiments of the present disclosure disclose methods and systems for efficient measurement in wireless system.

This summary is provided to introduce a selection of concepts, in a simplified format, that are further described in the detailed description of the invention. This summary is neither intended to identify key or essential inventive concepts of the invention and nor is it intended for determining the scope of the invention.

The methods and systems may be implemented for dynamically reducing number of measurement-samples which lead to significant reduction in power consumption of a User Equipment (UE). In one implementation, autonomous reduction in number of measurement of samples may be dynamically achieved based on SNR and/or mobility state of UE. Further, in such an implementation, gNB may assist in reducing number of measurement samples by dynamically adjusting density of measurement resources based on the UE inputs. In another implementation, dynamic selection of beams and/or cells by the UE may be allowed with the help of historical-data and/or gNB assistance information. In yet another implementation, misalignment of measurement occasion and DRX ON-duration may be eliminated by implementing following provisions:

With configuring measurement resources more densely in time domain so that total awake period is limited in spite of misalignment.

Additional WUS signal in nearest downlink symbol preceding the DRX ON-duration for the UFs or UE-group with same DRX-ON duration start. WUS configuration is provided as part of DRX configuration.

On demand application of WUS based on UE inputs and/or gNB assessment.

Measurement operation limited to adjacent beams/cells according to the serving cell channel conditions or UE mobility state The present subject matter describes performing radio resource management (RRM) measurements by a WTRU in a 3GPP networks. The method comprises defining at-least one of: a) a channel condition threshold, b) a WTRU mobility threshold, and c) a measurement-reliability threshold. A first sub-set of reference-signal samples are measured out of a set of reference-signal samples based on sensing at-least one of current channel conditions and mobility-conditions. A reliability-parameter associated with the first sub-set of measured samples is checked. Finally, network-measurement operation is concluded in case of the reliability-parameter being in accordance with the pre-defined reliability-thresholds:

In an embodiment of the present disclosure, a power saving approach to be utilized in wireless communication systems and terminals is disclosed. The present disclosure offers a generic solution for energy efficient 5G NR mobility measurement resource allocation, which caters all UEs while simultaneously realizing performance-optimized measurement implementation. Therefore, a power-saving signal design approach along with corresponding measurement is proposed. Moreover, the present disclosure provides a technique to fine-tune the measurement operations samples and frequency as a function of reliability and accuracy thresholds.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4a to 4d illustrates method steps, in accordance with another embodiment of the invention;

FIG. 7 illustrates a call flow diagram depicting coordinate dynamic PES configuration, according to an embodiment of the present disclosure;

DETAILED DESCRIPTION OF THE DRAWINGS

Figure 1:
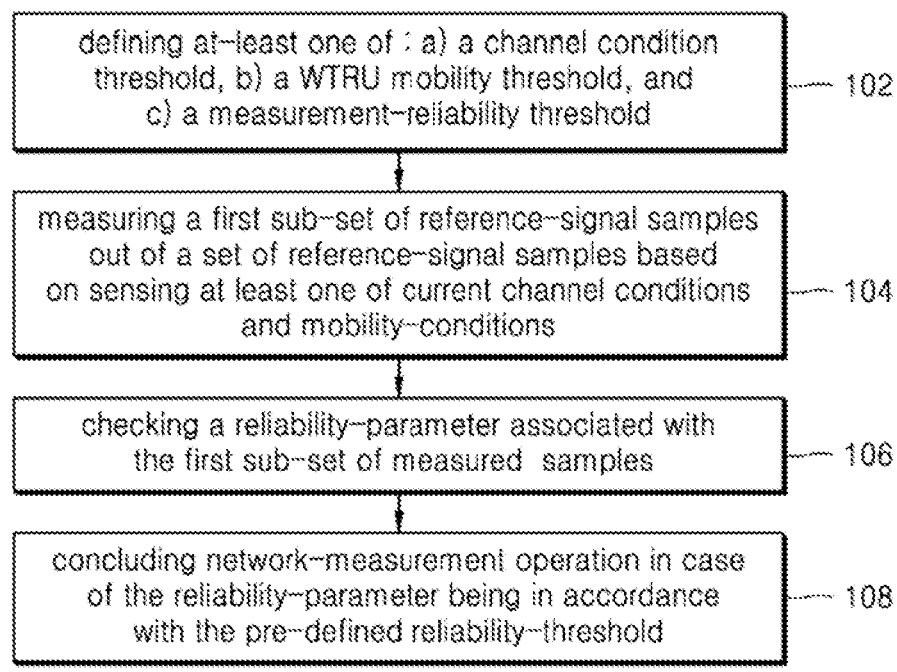
FIG. 1 illustrates method steps, in accordance with the embodiment of the invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching and illuminating some embodiments and their specific features and elements and therefore, should not be construed to limit, restrict or reduce the spirit and scope of the claims or their equivalents in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements presented in the attached claims. Some embodiments have been described for the purpose of explaining one or more of the potential ways in which the specific features and/or elements of the attached claims fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

FIG. 1 illustrates method steps, in accordance with the embodiment of the invention. The present subject matter refers a method for performing radio resource management (RRM) measurements by a WTRU in a 3GPP networks. The method comprises defining (step 102) at-least one of: a) a channel condition threshold, b) a WTRU mobility threshold, and c) a measurement-reliability threshold. In an implementation, the measurement-reliability threshold is configured by a gNB for different mobility-condition of the WTRU.

The method further comprises measuring (step 104) a first sub-set of reference-signal samples out of a set of reference-signal samples based on sensing at least one of current channel conditions and mobility-conditions. Thereafter, a second sub-set of reference-signal samples out of a set of reference-signal samples are measured if a reliability-parameter associated with the first-number of measured-samples being in accordance with the pre-defined reliability-threshold.

The method further comprises (step 106) checking a reliability-parameter associated with the first sub-set of measured-samples. The network-measurement operation is concluded (step 108) in case of the reliability-parameter being in accordance with the pre-defined reliability-threshold. In other words, the measurement of samples is pursued till attainment of the pre-defined reliability-threshold. In an implementation, the checking of the attainment of the pre-defined reliability-threshold is based on evaluation of RSRP and/or RS-SINR associated with the measured sub-set of samples i.e. whether the first and/or second set of samples whichever applicable. The method further comprises determining if a deviation of the measured RSRP and/or RS-SINR with respect to the previously measured sub-set of measured-samples is in accordance with the measurement-reliability threshold. Further, the gNB is further configured to adjust the density of the measurement-samples available to the UE to enable measurement of Tracking and Control Measurement (TCM) and mobility measurements with reliability.

According to an embodiment in accordance with the steps 102 till 106, the method of the present disclosure may be implemented in a User Equipment (UE) for performing cell power measurement (e.g. SSB/CSI-RS based serving or neighbour cell measurement) to dynamically stopping measurement for other samples in time domain, thereby eliminating power consumption of the UE. Further, the UE may receive assistance from the gNB for performing cell power measurement. The UE performing cell power measurement may dynamically decide to stop measurement for further samples in time domain based on current mobility state of the UE, channel condition, and reliability of measured data. Further, a threshold configured by gNB can be further used to decide whether to reduce the number of measurement samples or not by the UE. The gNB may configure threshold values to the UE including, but not limited to: A) A channel condition threshold value e.g. SNR (Signal to Noise Ratio), SINR (Signal to Interference and Noise Ratio) etc., B) a mobility threshold value, and C) Reliability factor. These conditions can be applied individually or in combination to determine the stopping of measurement operation. UE prioritizes specific BWP, frequency band or frequency range for measurement or indicates for prioritization to gNB. For example, if the channel condition is good based on the configured SNR threshold values, the UE may measure "N" samples. If the reliability is achieved based on measured "N" samples and the configured reliability threshold, the UE may stop measuring further samples. In other condition, if reliability is not achieved, the UE may measure further "M" samples and check the reliability. This process continues till reliable measurement data is captured. Such reliability check can be performed based on methods including, but not limited to, by simply checking the RSRP and/or RS-SINR (value calculated from e.g. "K" samples) deviation from the previous measurement occurrence and/or previous measurement samples is within reliability factor. Different values of reliability factor can be configured by the gNB for different mobility condition of the UE. During the process, if the UE determines the loss of reliability, then the UE may indicate such loss of reliability to the gNB. Such indication is through L1/MAC signalling based on methods including, but not limited to, adding a single bit indicating the gNB about reliability is increased or decreased. Subsequently, the gNB may adjust the density of the measurement samples available to the UE to perform measurement reliably for the AGC tuning as well as mobility measurements. Such adjustment can be achieved based on methods including, but not limited to, configuring a plurality of density values beforehand by RRC signalling and then dynamically indicating one of them through MAC/L1 signalling during the process.

Figure 2:
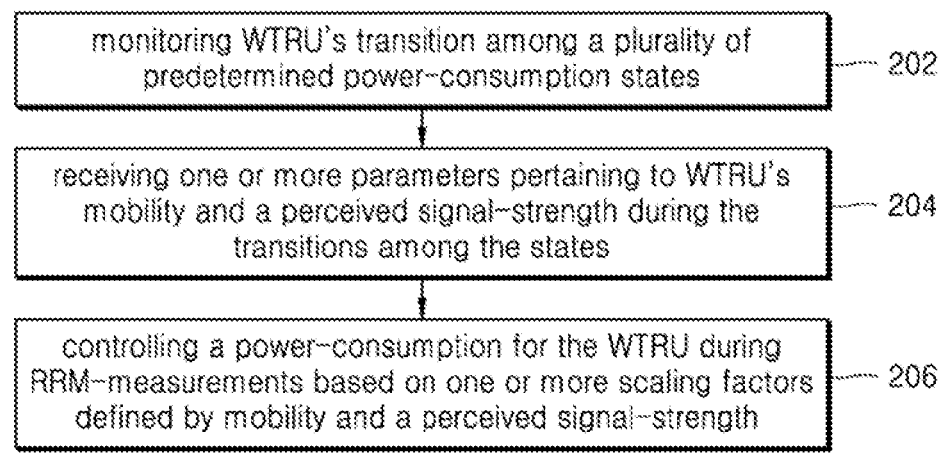
FIG. 2 illustrates method steps, in accordance with another embodiment of the invention.

FIG. 2 illustrates method steps, in accordance with another embodiment of the invention. The present subject matter refers a method for optimizing radio resource management (RRM) measurements by a WTRU in 3GPP-networks.

The method comprises monitoring (step 202) WTRU's transition among a plurality of predetermined power-consumption states. The power-consumption states are defined at-least by a Deep sleep state (S0), Light sleep state (S1), a WUS monitoring state (S2), Mobility measurement (S3), Control channel monitoring (S4), and Data reception (S5).

The method further comprises receiving (step 204) one or more parameters pertaining to WTRU's mobility and a perceived signal-strength during the transitions among the states (S0-S5). The parameter pertaining to WTRU's-mobility is UE's estimated-velocity based on a spatial-correlation. Further, the method comprises controlling (step 206) or adapting a power-consumption for the WTRU during RRM-measurements based on one or more scaling factors defined by mobility and a perceived signal-strength to meet at-least one of a pre-determined reliability threshold and a Quality of Service (QoS). The controlling of power-consumption comprises reducing proportionately the measurement samples, frequencies, cells, and beams based on scaling corresponding to mobility and signal-strength to thereby adapt RRM measurements.

Figure 3:
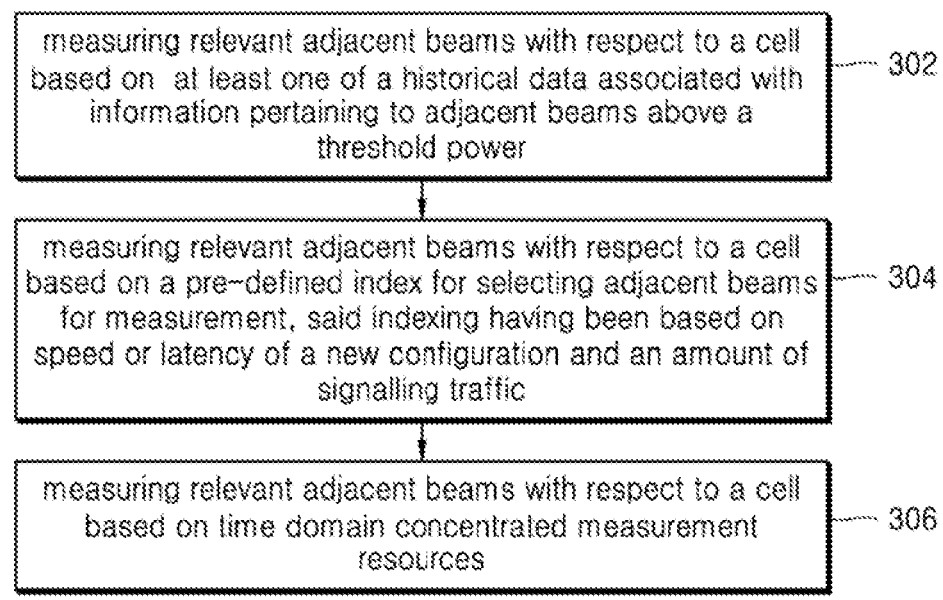
FIG. 3 illustrates method steps, in accordance with another embodiment of the invention.

Based on non-attainment of at-least one of the pre-determined reliability threshold and the Quality of Service (QoS), a switch may be made to alternate power saving scheme such as either a) 3GPP legacy DRX, and b) WUS based power saving scheme. In an implementation, QoS latency may be compared with respect to a packet delay budget and thereby ascertaining a QoS with respect to the currently-adapted power consumption may be ascertained. Accordingly, a WUS operation may be turning OFF/ON on detecting a degraded QoS and optimum QoS. FIG. 3 illustrates method steps, in accordance with another embodiment of the invention.

The present subject matter refers selectively performing radio resource management (RRM) measurements by a WTRU in a 3GPP networks. The method comprises measuring relevant adjacent beams with respect to a cell based on:
- a historical data (step 302) associated with information pertaining to adjacent beams above a threshold power;
- a pre-defined index (step 304) for selecting adjacent beams for measurement, said indexing having been based on speed or latency of a new configuration and an amount of signalling traffic; and
- a time domain concentrated measurement resources (step 306).

In an implementation, such beam-selection is based on gNB communication signaling procedures and based on speed or latency of new configuration and amount of signaling traffic. The static and/or low mobility states are determined by one of the gNB and the WTRU, based on at least one of rate of cell reselections, signal variations, positioning approaches defined by one or more of GPS, RSTD & OTDOA.

In another embodiment of the present disclosure, the UE may maintain historical data associated with information pertaining to strong adjacent beams. The UE may use the historical data for choosing and measuring only relevant adjacent beams for future measurement in the wireless system, provided measurement results are observed above threshold value. These thresholds can be based on previous results and/or configurations. Further, the UE may apply these embodiments in consideration to mobility states that include, but is not limited to, static and/or low mobility states etc. In such an embodiment, static and/or low mobility states may be determined by one of the gNB and the UE, based on methods including, but not limited to, rate of cell reselections, signal variations, positioning approaches like GPS (Global Positioning System), RSTD (Reference Signal Time Difference, and OTDOA (Observed Time Difference of Arrival). This way UE could reduce the number of beams for measurement operation and thereby, reduce the power consumption.

In another embodiment of the present disclosure, the gNB and the UE may have a prior agreement of indexing beams in the sequential manner, or indicated by the gNB to the UE using codebook index from the list of pre-defined codebook which may help in selecting the adjacent beams for measurement. In an embodiment, signaling procedures may be selected based on speed or latency of new configuration and amount of signaling traffic that need to be applied. In an embodiment, the additional assistance information may include, but is not limited, to indexed values.

In another embodiment of the present disclosure, the UE may select beams/cells in such a manner that they are concentrated in time domain with respect to each other. Owing to such selection of beams/cells, awake time required for serving/neighbour cell measurements is substantially reduced which further results in power saving of the UE. The gNB may transmit signal associated with additional assistance information through one of Layer 1 (L1) signaling, Medium Access Control—Control Element (MAC CE) signaling, and Radio Resource Control (RRC) signaling, for assisting the UE in choosing adjacent beams and/or time domain concentrated measurement resources. In an embodiment, signaling procedures may be selected based on speed or latency of new configuration and amount of signaling traffic that need to be applied. In an embodiment, the additional assistance information may include, but is not limited to, time offsets-absolute values and/or indexed values.

In an embodiment, UE prioritizes specific BWP, frequency band or frequency range for measurement or indicates for prioritization to gNB. FR1 provides for lower frequency, higher coverage, lower path-loss, lesser BW, & wider beams in comparison to FR2. Selecting the FR1 for performing measurements may result in saving more power with less beam sweeping operations. Prioritization may be done based on the state of the UE, traffic/data rates being availed etc. E.g., UE in idle mode may prefer FR1 over FR2. In another case during high data rates traffic, FR2 is preferred over FR1 to enable high throughput. When indicating frequency prioritization to the gNB, UE utilizes UE assistance information message and conveys one or more frequencies with regard to their priorities.

In another embodiment, UE applies reselection band priority inversion etc. based on measurement frequency prioritization. This implies UE gives higher priority to the cell which pertains to prioritized measurement frequency even when the cell ranking and/or priority and/or signal condition is lower than the cell which is pertaining to non-prioritized frequency. This ensures UE reselects to a cell which pertains to prioritized frequency and ensures efficient measurements operations and power saving for the UE.

Figure 4A:
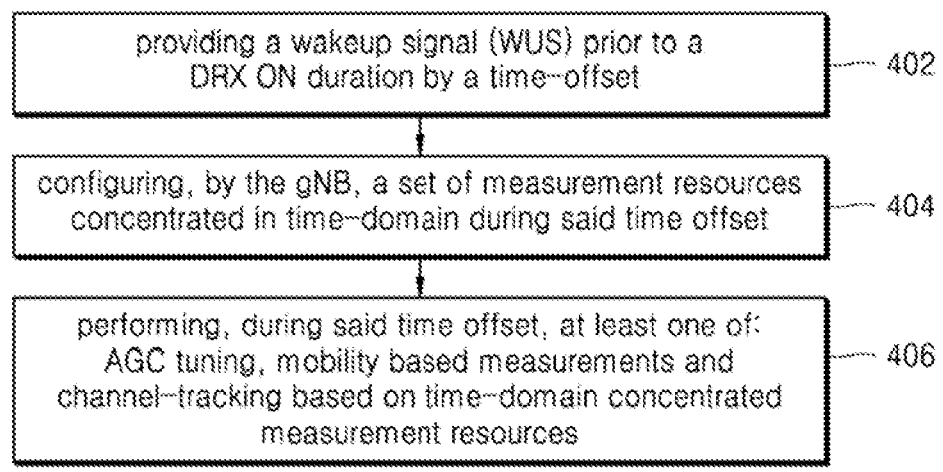

FIG. 4a illustrates method steps, in accordance with another embodiment of the invention. The present subject matter refers a method for performing radio resource management (RRM) measurements by a WTRU in a 3GPP networks to eliminate misalignment between measurement-resources and a DRX-ON duration.

The method comprises providing (step 402) a wakeup signal (WUS) prior to a DRX-ON duration by a time-offset by at-least one of: an SSS signal resource for providing the WUS at least based on one OFDM symbol, and an SSB signal resource at least based on four OFDM symbols, a CSIRS signal resources and at least one or more PDCCH based DCI(s) (Downlink Control Channel). The WUS is communicated based on a periodic reference signal configured by gNB, said WUS defined by at-least one of: CSIRS, SSS, SSB, PBCH DMRS, TRS, and PRS or one or more PDCCH based DCI(s).

In an example, in case of employment of SSS/CSI-RS signal resources for providing the WUS signal, the WUS is defined by a combined periodicity of the SSB and the WUS signal being less than a periodicity of the SSB. In other example, the WUS is signalled through broadcast signalling by gNB. In yet another example, the WUS may be provided by a common scrambling-identity in case of employment of the CSI-RS signal resources for providing the WUS signal.

Further, the method comprises configuring (step 404), by the gNB, a set of measurement resources concentrated in time-domain during said time offset. These measurement resources can be consisting one of the CSIRS, SSS, SSB, PBCH DMRS, TRS, and PRS signal resources. That is to say, measurement resources can be additional to WUS if WUS is not consisting of resources used for measurement purpose i.e. WUS is composed of PDCCH DCI(s). During said time offset, the method further comprises performing (step 406) at-least one of: AGC tuning, mobility based measurements and channel-tracking based on time-domain concentrated measurement resources.

The present embodiment in accordance with steps 402 till 406 may be implemented for reducing power consumption occurred due to timing gap between measurement and Discontinuous Reception (DRX) ON duration. The UE is configured to perform measurement and the DRX ON-duration. In the DRX ON duration, the UE may normally be scheduled to be awake to receive signal from the wireless network. Generally, SMTC (SSB Measurement Timing Configuration) window is cell specific configuration, whereas DRX configuration for connected mode UE is UE specific. Owing to such configurations, a misalignment may occur in terms of timing of the measurement occasion, i.e., timing gap between measurement and DRX ON duration performed by the UE. Consequently, the UE may need to extend awake duration beyond normal DRX ON duration, which may lead to excessive power consumption. Also, when UE comes back from DRX sleep the AGC (Automatic Gain Control), Automatic Frequency Correction (AFC), Symbol Time Recovery (STR) and Phase Tracking Recovery (PTR) of the UE is not synchronized and is therefore, needs to be tuned. In general, AGC/AFC/STR/PTR tuning requires some measurements of Reference Signals (RS) and this can be followed by normal mobility measurements by the UE.

According to one of the embodiments of the present disclosure, to eliminate misalignment, measurement resources may be configured densely in time domain to limit total awake duration for the UE or a UE-group. This leads to availability of sufficient samples or density of measurement resources in the nearest time region with respect to the ON-duration of the UE to perform measurement reliably for the AGC tuning as well as mobility measurements. However, this would be necessitated based on certain conditions e.g. the UE coming up after long DRX sleep. Accordingly, the gNB may devise the UE specific configuration for measurement resources. Hence, the UE may need not to extend the awake-period waiting for the next measurement resources to complete the RRM measurement.

According to another embodiment of the present disclosure, to eliminate misalignment, additional measurement resources, may be provided prior to DRX ON duration to assist the UE in tuning the AGC and performing channel tracking. This is specifically required when UE comes back from DRX sleep and loose AGC tuning. Performing such operation during regular measurement occasion may further delay mobility measurements and prolong awake period leading to increased power consumption. In an embodiment, the measurement resources may be provided to the UE using signal resources, such as, but not limited to, Synchronization Signal Block Signal (SSB), secondary synchronization signal (SSS), Channel State Indication—Reference Symbol (CSIRS), Physical Broadcast Channel Delta Modulation Reference Symbol (PBCH DMRS), Timing Reference Signal (TRS), and Positioning Reference signal (PRS).

In an embodiment, implementing the SSS signal resource for providing the measurement facilitates resource efficiency as one OFDM symbol is used as compared to four symbols used for regular SSB. In another embodiment, where the SSS signal resource is implemented for providing the measurement, accuracy of the measurements is increased. Furthermore, in said embodiment, the density may be controlled for suiting different requirements. As a result, a plurality of density configuration for measurements resources can be configured by the network. As an example, density parameter can be 1, 3 etc., that implies in frequency domain one or three resources elements, respectively, per sub-carrier per resource symbol are provided for measurement. In an example, configuration of the WUS signal can be provided to the UE as part of DRX configuration.

According to one of the embodiments of the present disclosure, when due to misalignment of timings e.g. DRX active time between the UE and the gNB may not be synchronized due to various reasons. For example, the UE initiated uplink data traffic and remains in active time, however the gNB assumes UE to be in DRX inactive time. In such scenario, there is possibility that measurement operation does not work as expected e.g. network may not transmit measurement resources or signal. The UE applies a measurement validation check to ensure the measurement result is satisfying some threshold value e.g. a determined value of measurement quantity for RSRP/RSRQ/SINR etc. The threshold can be derived based on previous measurement results and in line with the expected measurement result. The UE undertakes the discard of the measurement result and/or further pursue measurement based on this determination.

In an example, the WUS signal may also be shared among a plurality of UEs with some common configuration. In said example, the gNB provides the configuration for the WUS signal to the UEs by means of broadcast signaling, such as system information broadcast or through dedicated RRC signaling to respective UEs.

In yet another embodiment of the present disclosure, when CSI-RS signal resources are implemented for providing Pre-DRX ON measurement, common scrambling identity, provided in DRX configuration, is applied to enable all UEs to decode the WUS signal. In said embodiment, the transmission of the CSI-RS signal is located in the nearest downlink symbol preceding to the DRX ON-duration start. Furthermore, in an example where the UEs have same DRX ON-duration start, it is possible to use the same CSI-RS signal for the multiple UEs by suitably configuring the UEs and the gNB. Alternatively, gNB provides a time-offset to enable a UE or the UEs to determine the occasion for the CSI-RS signal, which can be provided by dedicated configuration or can be pre-fixed or pre-configured.

In another embodiment of the present disclosure, the WUS signal may be provided to the UE on demand basis for reducing/eliminating system burden and crowding of the resources. In said implementation, the WUS is provided selectively by the gNB based on receiving UE communicated channel conditions defined by at-least one of: RSRP, RSRQ, SINR, mobility status, assessing at-least one of DRX-cycles and uplink measurements based on said receipt of UE communication. The UE may be configured to skip WUS monitoring based on assessing presence of control channel monitoring at substantially every DRX cycle.

As may be understood, while the WUS signal acts at trigger for scheduling or timing the measurement of resources, the WUS signal may also be construed to itself act as a reference signal that capable of being measured by the UE. The WUS signal may also act as indicator to the UE for measurement resources.

In said embodiment, UE inputs (channel conditions e.g. in terms of RSRP, RSRQ, SINR, mobility status e.g. mobility states, velocity, speed, direction etc.) and/or gNB assessment (e.g. about DRX operation, uplink measurements) facilitate in determining the WUS transmission on a case-to-case basis. As an example, the gNB is aware about the DRX operation of the UE and accordingly, the gNB determines whether the UE has undergone short DRX sleep, or long DRX sleep, or in general the duration for which UE was inactive and/or in sleep. Accordingly, the gNB determines whether the WUS signal is to be provided or not. To illustrate by example, the gNB's knowledge of the short or long DRX sleep can be used to discriminate for providing the WUS signal and/or density/number of sample, or type of signal for the measurement resources. As may be understood, the gNB may use CSIRS resources with higher density as it provides more accurate results and consumes less power as compared to SSS or SSB measurement resources.

Figure 4B:
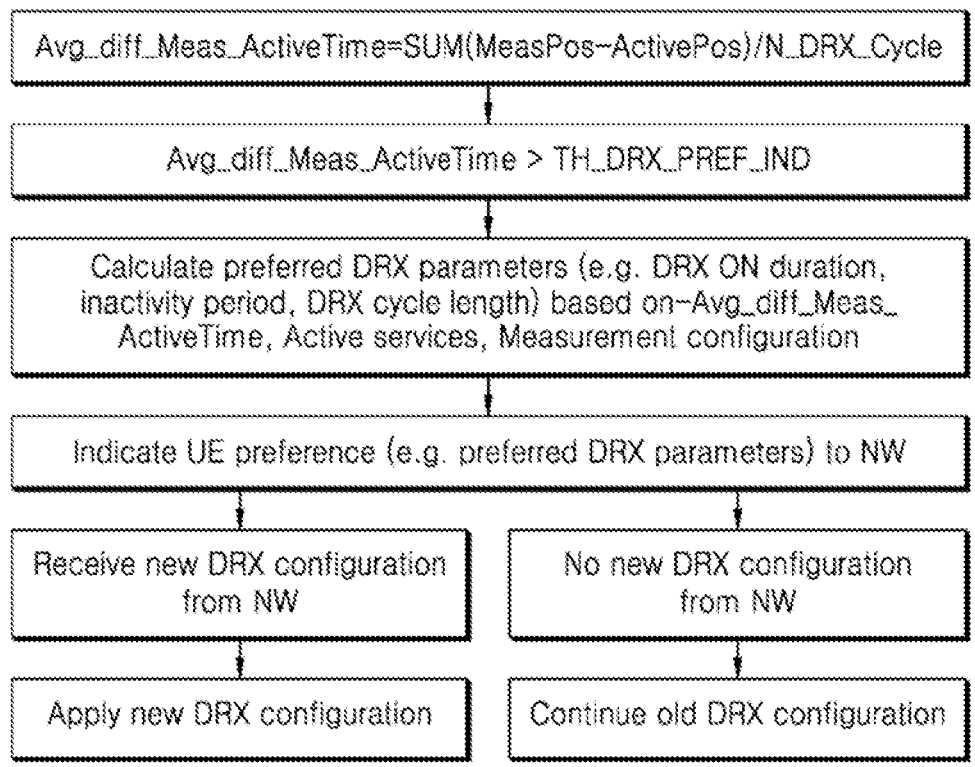

FIG. 4b illustrates an example implementation depicting Efficient Measurement to address SMTC & DRX Misalignment. UE determines the misalignment of the SMTC and DRX active time and average over a number of DRX cycles. The resultant value is compared against a defined threshold value of misalignment and if it exceeds the threshold for misalignment, UE calculates the preferred set of values for DRX parameters. These DRX parameters may include at least one of DRX ON duration, DRX inactivity timer, DRX offset, DRX cycle length etc. based on resultant value of misalignment observed. UE intends to choose the DRX parameters values so as to eliminate and/or reduce the misalignment of the SMTC and DRX active time based on calculated DRX parameters values. These set of preferred DRX parameters are reported to gNB via the UE assistance information message, gNB on receiving this information, can pursue to modify the DRX parameters for the UE and/or change the measurement configurations e.g. timings, allocating a dedicated measurement resources or change the density of the measurement resources. UE applies the new set of DRX parameters if provided or continues with existing set of values, as the case may be.

In an embodiment, to eliminate misalignment, suitable UE specific measurement configuration and/or measurement resources may be configured densely in time domain to limit total awake duration for UE or a UE-group. This leads to availability of sufficient samples or density of measurement resources in the nearest time region with respect to ON-duration of UE to perform measurement reliably for AGC/AFC/STR/PTR tuning as well as mobility measurements. In certain cases, this may be necessitated based on certain conditions e.g.

Channel conditions and mobility states of UE, UE coming up after long DRX sleep

UE is frequently switching between stacks in DSDS scenario.

UE assistance information is used to convey this need. The present implementation is in line with standard direction & addresses UE preferred DRX information-sharing.

FIG. 4c illustrates a Field log Example based on SMTC and CDRX configuration. As noticed from FIG. 4c, the SMTC periodicity is 20 ms whereas ON duration is 10 ms. Moreover due to ILM delay UE is not able to measure in first SMTC beginning and waits for second SMTC. Measurement is completed after 21 ms. Had it been SMTC in accordance with UE DRX on duration, with smaller periodicity e.g. 10 ms, measurement could be done even more quickly.

Figure 4D:
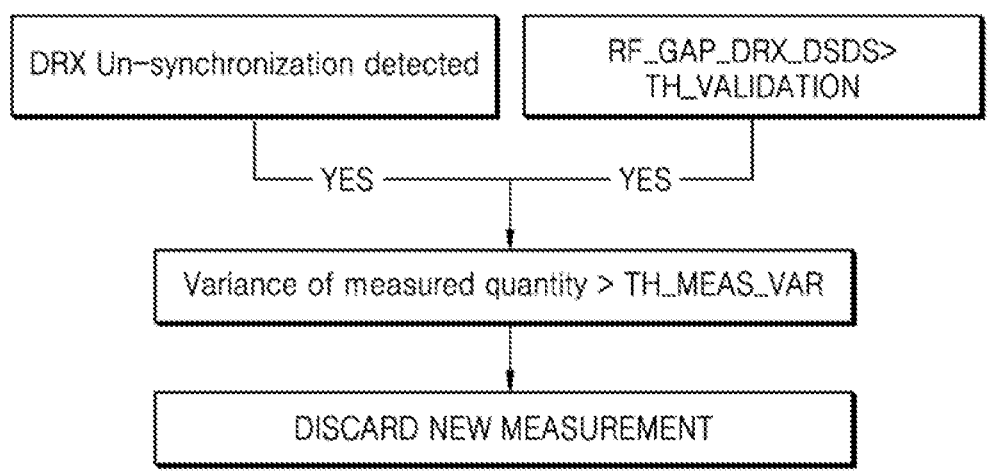

FIG. 4d illustrates Measurement Validation in accordance with an embodiment of the present subject matter, when due to misalignment of timings e.g. DRX active time between the UE and the gNB may not be synchronized due to various reasons. E.g., the UE initiated uplink data traffic and remains in active time, however gNB assumes UE to be in DRX inactive time. In such scenario, there is possibility that measurement operation does not work as expected (gNB does not transmit measure resources). UE applies a measurement validation check to ensure measurement result is satisfying a threshold value. Threshold can be derived based on previous measurement results and in line with the expected measurement result. Same problem can also be experienced in a DSDS scenario where UE and gNB can go out of sync with respect to DRX active time post DSDS gaps. The present invention refers to a UE implementation approach and addresses a plurality of issues in real life scenario.

Figure 5:
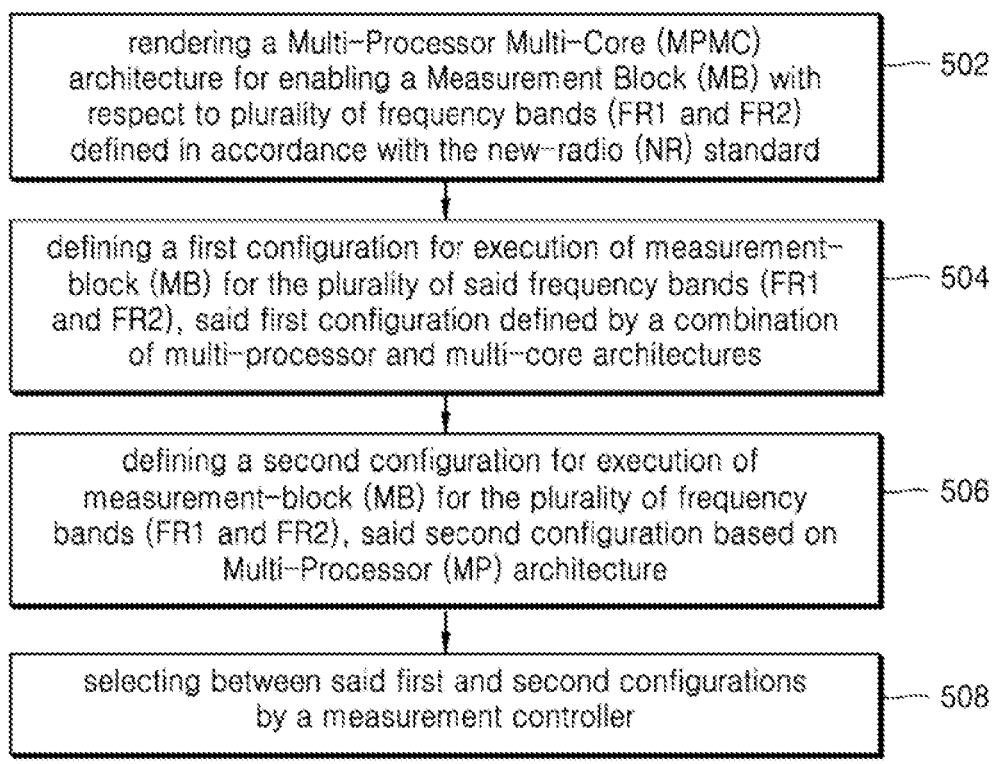
FIG. 5 illustrates method steps, in accordance with another embodiment of the invention.

FIG. 5 illustrates method steps, in accordance with another embodiment of the invention; The present subject matter refers a method for performing measurements as a part of radio resource management (RRM) measurements by the WTRU with respect to plurality of frequency bands (FR1 and FR2). The method comprises rendering (step 502) a Multi-Processor Multi-Core (MPMC) architecture for enabling a Measurement Block (MB) with respect to plurality of frequency bands (FR1 and FR2) defined in accordance with the new-radio (NR) standard.

Further, the method comprises defining (step 504) a first configuration for execution of measurement-block (MB) for the plurality of said frequency bands (FR1 and FR2). The first configuration is defined by a combination of multi-processor and multi-core architectures. In an implementation, the first-configuration is defined as at-least one of: (a) a hardware-control configuration defined by a Multi-Processor (MP) architecture for beamforming management; and (b) a higher-layer configuration and result-processing defined by in Multi-Core (MC) processor.

The method further comprise defining (step 506) a second configuration for execution of measurement-block (MB) for the plurality of frequency bands (FR1 and FR2), said second configuration based on Multi-Processor (MP) architecture. The second-configuration is defined as at-least one of (a) a hardware-control configuration for beamforming management. (b) a higher-layer configuration and result-processing, and (c) non-time-critical requirements of frame-synchronization tasks in a pulse coded modulation (PCM).

The method further comprises selecting (step 508) between said first and second configurations by a measurement controller based on at least one of (a) expected processing load, (b) a number of measurement samples based on mobility, (c) a number of measurement samples based on signal strength and (d) a frequency range, (e) power consumption, (f) UL traffic pattern, (g) UL traffic volume (h) current network latency, (i) current network delay and (j) a battery level. Further, the method comprises (step 508) prioritizing measurements with respect to one frequency-band (FR1) of the plurality of frequency band over another frequency band (FR2) and vice versa based on at-least one of state of the UE, traffic rate, data-rate.

In an embodiment of the present disclosure, the UE may prioritize the measurement pertaining to the specific band of frequency. As an example, the UE may prioritize an FR1 (Frequency Range 1 i.e. sub 6 GHz) over an FR2 (Frequency Range 2, above 6 GHz). The FR1 provides for lower frequency, higher coverage, lower path-loss, lesser bandwidth, and wider beams in comparison to the FR2. Therefore, selecting the FR1 for performing measurements may result in saving more power as less beam-sweeping operations are required. In certain embodiments, the prioritization may be done based on the state of the UE, traffic/data rates being availed etc. For example, the UE in an idle mode may prefer the FR1 over the FR2. In another example, during high data rates traffic, the FR2 is preferred over FR1 to enable high throughput. Reselection band priority/inversion etc. is applied based on measurement frequency prioritization.

As would be appreciated, in an embodiment of the present subject matter, a combination of the aforementioned approaches is applied. For example, a combination of measurement resources like CSI-RS or SSS or SSB can be used for same or different UEs.

Figure 6A:
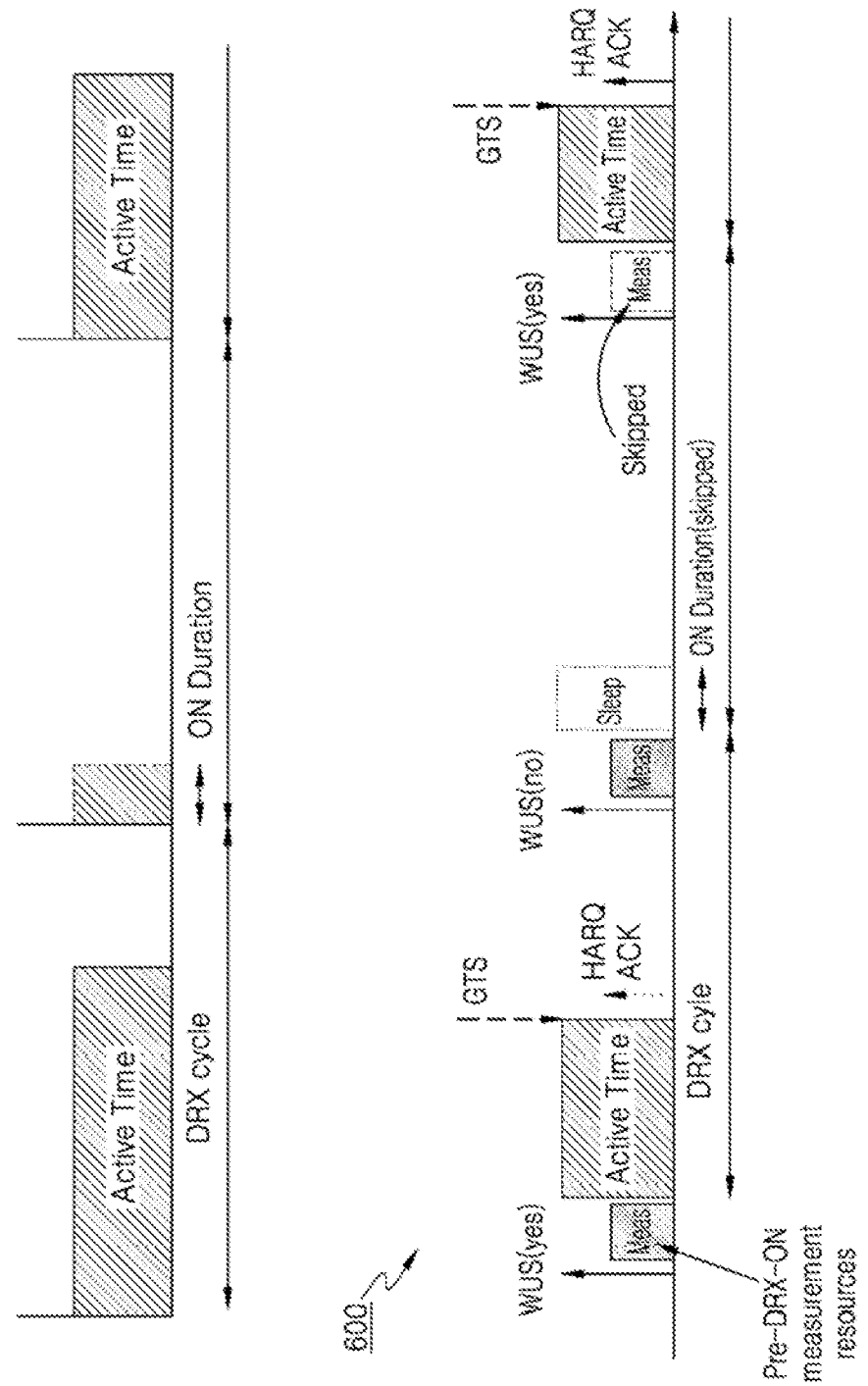
FIG. 6a to 6f illustrates a graph depicting User Equipment (UE) behaviour for Power Efficient Scheme (PES) through reception of power saving signals and performing optimized measurement operation.

FIG. 6a illustrates a diagram 600 depicting User Equipment (UE) behaviour for Power Efficient Scheme (PES) through reception of power saving signals and performing optimized measurement operation and corresponds to the embodiment as referred in FIG. 1 to FIG. 4a.

In connected mode DRX cycle, the UE wakes up at the starting of the DRX cycle and monitors control channels for a period of time (On-duration time) configured by the network. If a control channel is found by the UE and data allocation for the UE is indicated in the same, the UE starts reception of data accordingly. Further, if data is no longer received for a duration of time (Inactivity timer) configured by network, the UE moves to sleep state. Also, when no allocation is indicated in control channel during On-duration, the UE moves to sleep state. Therefore, Active Time of the UE is constituted by On-duration and Inactivity timers. However, monitoring control channels at a regular interval is a major source of high power consumption for the UE. Keeping the UE in Active Time if there is no data expected also increases the UE power consumption unnecessarily.

(a) Power Saving signals: To avoid undesired UE power consumption, Network transmits power saving signals, for example, Wake-Up Signal (WUS) and Go-To-Sleep (GTS). If there is no data to be transmitted, the network does not transmit any control channel indicating the data resource allocation for the UE. Therefore, in that case, monitoring control channel by the UE unnecessarily increase the power load on the UE. In order to indicate the presence/absence of control channels, very low power consuming WUS is transmitted before DRX-ON by the network. The UE skips to monitor high power consuming control channels and moves back to sleep state if WUS indicates absence of the same. If presence of control channel is indicated by WUS, the UE monitors control channels and further moves into data reception/transmission mode. Once data exchange is completed, the UE waits for some preconfigured finite time (Inactivity time) to monitor control channels for further data resource allocation before moving into sleep state. If there is no more data to be exchanged in the current DRX cycle, UE Active Time gets prolonged unnecessarily due to such inefficient mechanism. To reduce such unnecessary burden on the UE, early sleep in the Active Time of DRX cycle is initiated by the network by transmitting GTS if there is no more data exchange expected. The position of WUS and GTS is designed in accordance with the configured DRX cycle.

(b) Measurement control (time domain): Another source of high power consumption is performing mobility measurements in a periodic manner which prolongs the UE Active Time. The prolongation amount depends on majorly two factors: a) number of samples on which the measurement has to be performed and b) location of the measurement samples in the time domain. The factor mentioned in (a) not only extend the Active Time but also directly impacts on power consumption due to more number of samples processing. Number of measurement samples depends on number of candidates for measurement as well as measurement samples to be averaged per candidate for getting an accurate measurement data. The present disclosure cites that the UE performing measurements adapts the number of samples in time domain based on its mobility, channel condition and reliability of measurement.

(c) Measurement control (frequency domain): It is experimentally observed that, measurement accuracy can be obtained with less number of measurement samples in time domain along with improved RS density over the frequency domain when the prevalent network condition is not changing at a faster rate and the UE is in a favourable channel condition. Similarly performing periodic measurement on some candidates may become irrelevant due to network topology not changing frequently. Hence there is a need for the UE to adapt with the prevalent network topology to control the number of measurement samples thereby improving UE power consumption profile. However, this needs to be done in accordance with network so that the density and position of the transmitted RSs can be adjusted accordingly. On detection of such mobility condition, the UE indicates to the network about the same. The network in turn changes the CSI-RS configuration, for example, increasing density to improve accuracy of measurement, to facilitate the UE in reducing the measurement samples.

(d) Early Measurement for synchronization: At the end of DRX cycle, the UE moves into sleep duration where the UE powers down its RF module and stops receiving any signal from the network. For a high mobility UE and/or prolonged sleep period, there is a possibility of UE losing the synchronization with the network in terms of time-frequency offset, AGC tuning etc. As a consequence, the UE needs to power ON its RF module a little ahead of exact DRX Active Time to monitor RS (SSB, CSI-RS and or TRS) and calculate and train the HW with the corresponding AGC, AFC, STR, CTE values so that it is completely in sync with the network at the beginning of the DRX Active Time. Since SSB location is fixed and not always in sync with the DRX configuration, the UE may not always get the latest sync/tracking information if it depends on the SSB. Also CSI-RS and TRS provide more accurate power information. However, their positioning on time domain may not be in sync with the DRX configuration and this may again lead to UE depending on the stale information for sync. Another problem that may arise is the UE prolonging its Active Time due to wait for such RSs which again impacts adversely to the UE power consumption. Therefore, in order to facilitate early measurement for channel tracking and synchronization with the network as well as obtaining better power profile, CSI-RS resources are proposed to be provided in the gap between WUS and DRX-ON duration as shown in FIG. 6. Measurement resources allocation and operations are controlled as function of UE mobility and signal strengths as indicated by the UE. Let's consider a case where WUS indicates there is no control channel monitoring required. In such a case, the UE needs to prolong its Active Time till measurement resources are positioned in time domain. With CSI-RS resources present before starting of DRX cycle, the UE moves to sleep mode directly after completing the early measurement.

This way, the Active Time due to measurement is significantly reduced by means of different PES schemes. Thus PES helps in saving precious UE power by reducing two major power consuming sources.

(e) Power saving signalling on demand: Monitoring WUS is introduced to reduce UE power consumption by skipping unnecessary control channel monitoring when there is no data to be exchanged due to the bursty nature of the traffic. However, monitoring WUS adds some extra load on UE in relation with power consumption. Depending on service traffic pattern and network data resource scheduling, the presence of control channel indicating data resource allocation can be every DRX cycle in some cases and can be scarce in some other cases. In a situation when resource allocation is almost at every DRX cycle, it is unnecessary burden to the UE to monitor WUS along with control channel every DRX cycle. WUS is particularly helpful when the pattern is sporadic and the UE can skip monitoring control channel for most of the DRX cycle. Therefore, it is necessary to make WUS an on-demand signal adapting to the traffic pattern and network scheduling condition.

Figure 6B:
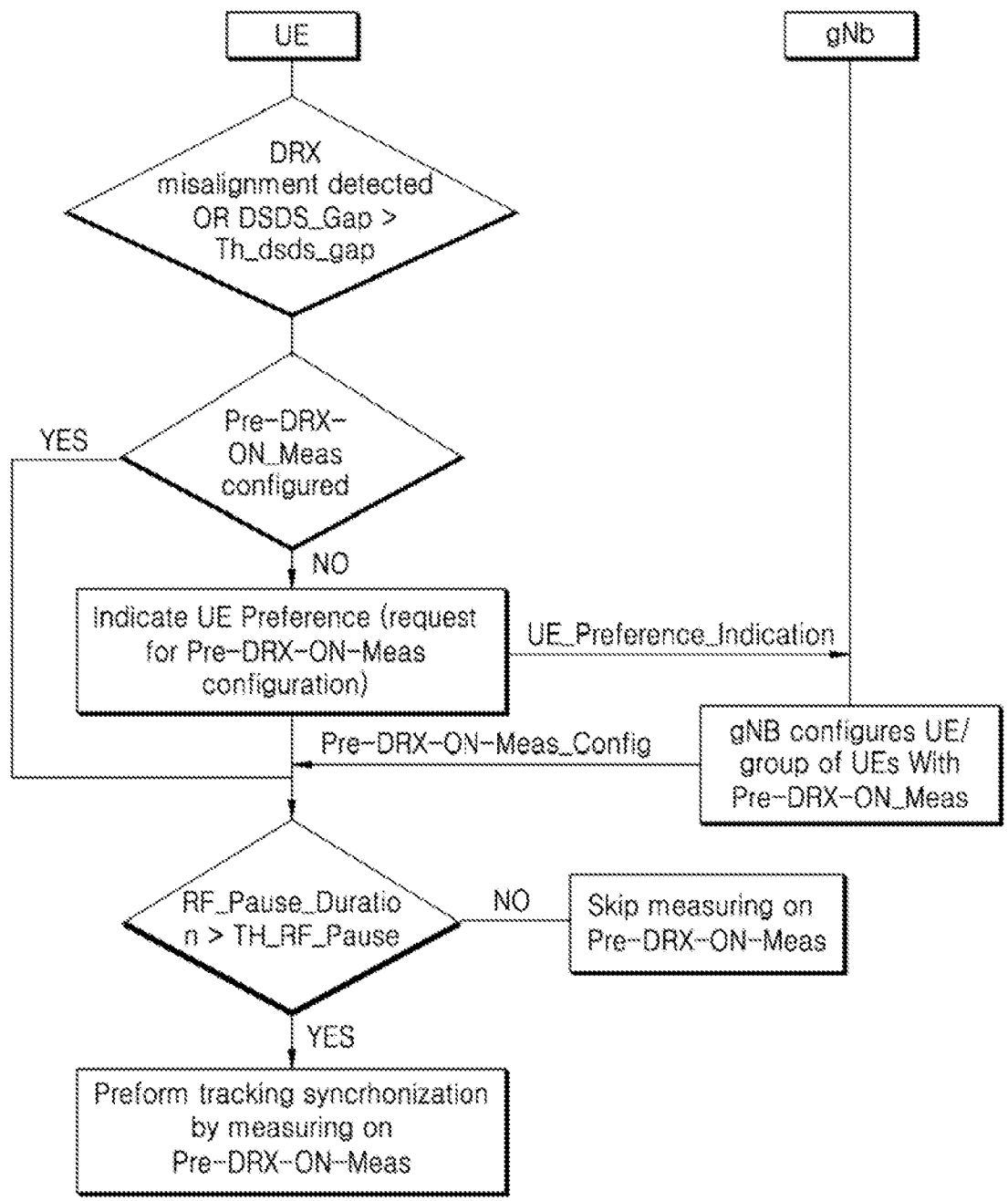
Figure 6C:
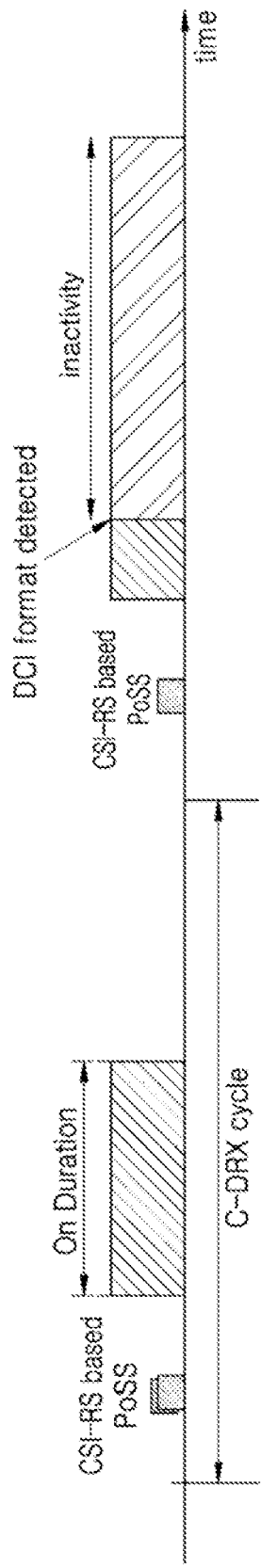

FIG. 6b illustrates a pre-DRX-ON Measurement for tracking. As indicated with respect to FIG. 6a and FIG. 6b, measure resources configuration and transmission has been depicted before DRX ON period. The signal design refers to single/groups UEs, common scrambling identity, offset, signalling configuration. The UE preference indication is communication to gNB as UE assistance information.

Unlike legacy system, NR is not equipped with always on CRS signals and therefore, there is no early channel tracking/measurement possibility. LTE system could do early AGC tuning with about 3 ms way ahead of DRX ON utilizing always on CRS resources, that is good reference to the synchronization time and need. To address this, FIG. 6c refers one of the candidate solutions from the gNB assisted way, whereby it is considered to configure additional RS for Channel tracking/RRM measurement outside C-DRX on duration. In Rel-15, UE is only configured to perform CSI-RS based measurement confined in the active time of C-DRX and over RB resources within the associated DL active BWP. However, if it is determined that measurement results for serving cell after waking up is not good or beam tracking for neighbouring cell is needed, it might be beneficial that UE have more flexibility on mobility measurement based on RS resources associated with C-DRX but not confined strictly within the active time and active DL BWP. For this purpose additional RS such as CSI-RS based power saving signal can be configured outside C-DRX on duration with monitoring periodicity associated with C-DRX cycle.

With regard to detailing the configuration, one or two CSIRS symbols based measurement resources are specified and positioned in between the WUS and DRX ON durations. Offset and resource configuration along with common scrambling identity for a group of UEs are enabled through RRC signaling.

Figure 6D:
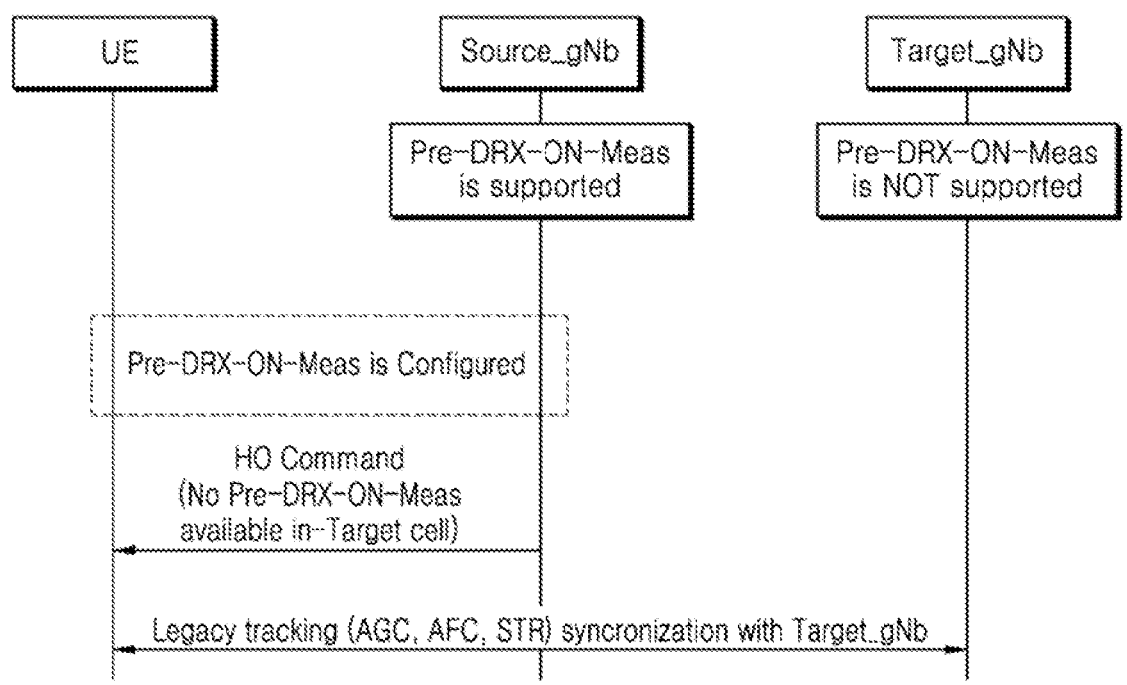
Figure 6E:
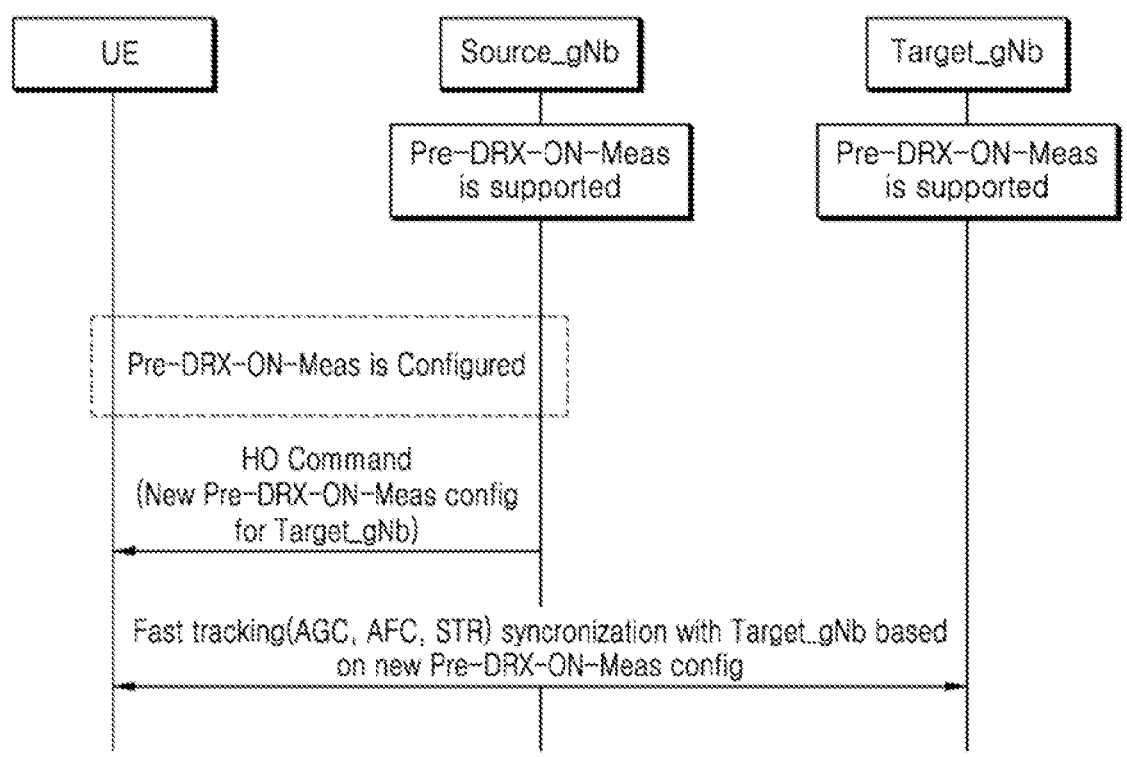
Figure 6F:
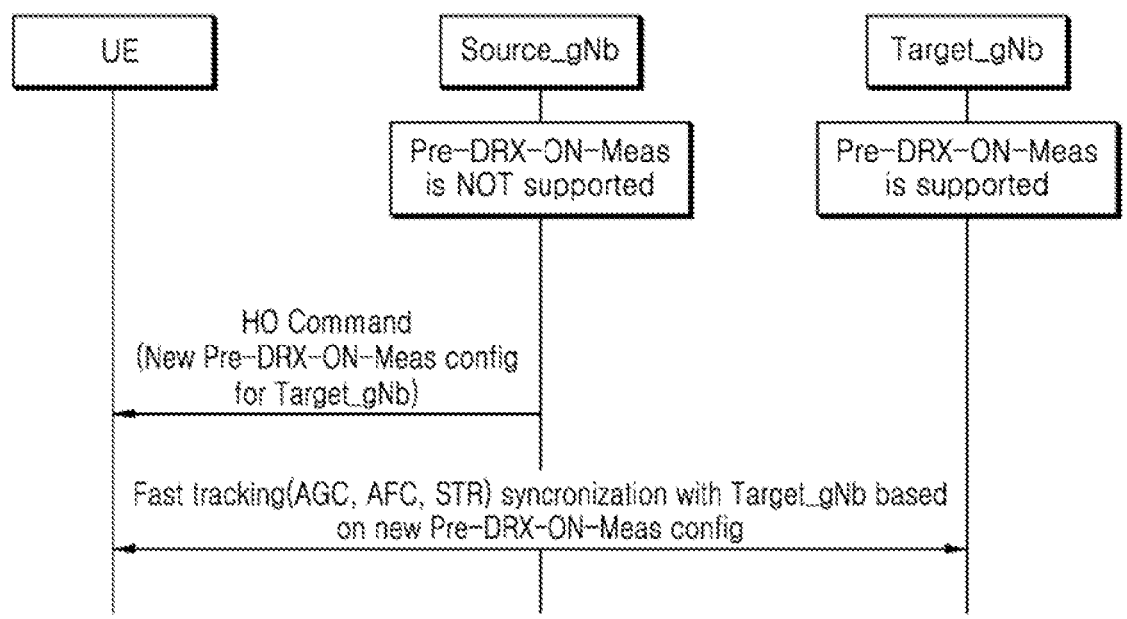

FIG. 6d to FIG. 6f further refers an implementation depicting power-saving and continuity of measurement based implementation. FIG. 6d refers a scenario that Target cell does not support Pre-DRX-ON Measurement/power saving. FIG. 6e refers a scenario wherein Target cell supports Pre-DRX-ON Measurement/power saving. FIG. 6f refers a scenario wherein Target cell only supports Pre-DRX-ON Measurement/Power saving.

Overall, FIG. 6d to FIG. 6f collectively address power saving and channel tracking across the cells during mobility. It is specified that the handover command massage which is the RRC reconfiguration message triggering handover of the UE from the source cell to the target cell provides the information of the power saving signal configuration and/or pre-DRX-ON Measurements resources configuration in the target cell to facilitate the UE to perform seamless continuity for power saving and/or measurement operations. In case, it is not supported on target cell, it is also informed to the UE.

In an embodiment, additional approaches are provided that include UE reselection and/or handover to provide seamless power saving/measurement continuity e.g. reselection/handover priority for cells supporting power saving/measure resources. This therefore becomes a basis for performing reselection and/or handover. UE maintains a cell information list to consider higher priority to the reselection to cells which support power saving/Pre DRX ON measurement resources. Similarly, gNB prioritizes handover to the target cell which can facilitate the power saving and/or Pre DRX-ON measurement resources for the UE post-handover.

In another embodiment, immediately after handover, power saving/Pre-DRX-ON Measurement request are triggered thereby in turn triggering UE assistance. This facilitates earliest possible configuration of the power saving/Pre-DRX-ON Measurement resources in the target cell for faster AGC/AFC/STR/PTR tuning in the target cell.

FIG. 7 illustrates a call flow diagram 700 depicting coordinate dynamic PES configuration, according to an embodiment of the present disclosure and corresponds to the embodiment as referred in FIG. 4. The call flow diagram 700 depicts a coordinated mechanism between the UE and the network to enable power saving signals on-demand. Although the network has DL traffic pattern information and its own load/scheduling condition, it has no or very little information about the UE UL traffic pattern/volume, battery level, and UL TX power. The UE indicates such relevant information to the network on request to facilitate the network to decide on coming out of PES. Finally, the network configures the UE to skip WUS monitoring if control channel monitoring at almost every DRX cycle becomes evident. On the other hand, when condition for enabling PES is met, the network configures WUS and associated configuration (e.g. CSI-RS in between WUS and DRX-ON). Further, the UE indicates its state transition assistance information, for example, UL traffic pattern/traffic volume, battery level, and UL TX power pattern, which the network considers along with its own traffic/load conditions to determine Active to Idle/Inactive state transition or moving the UE into PES.

System Model & Proposed Solution

As stated earlier, the legacy LTE and 3G systems have adopted the conventional DRX mechanism. However, with change in radio technology accompanied with introduction of more dynamic and not always-on RS and WUS, the existing DRX mechanism needs to be adapted. The present subject matter at least addressed these new requirements.

Figure 8A:
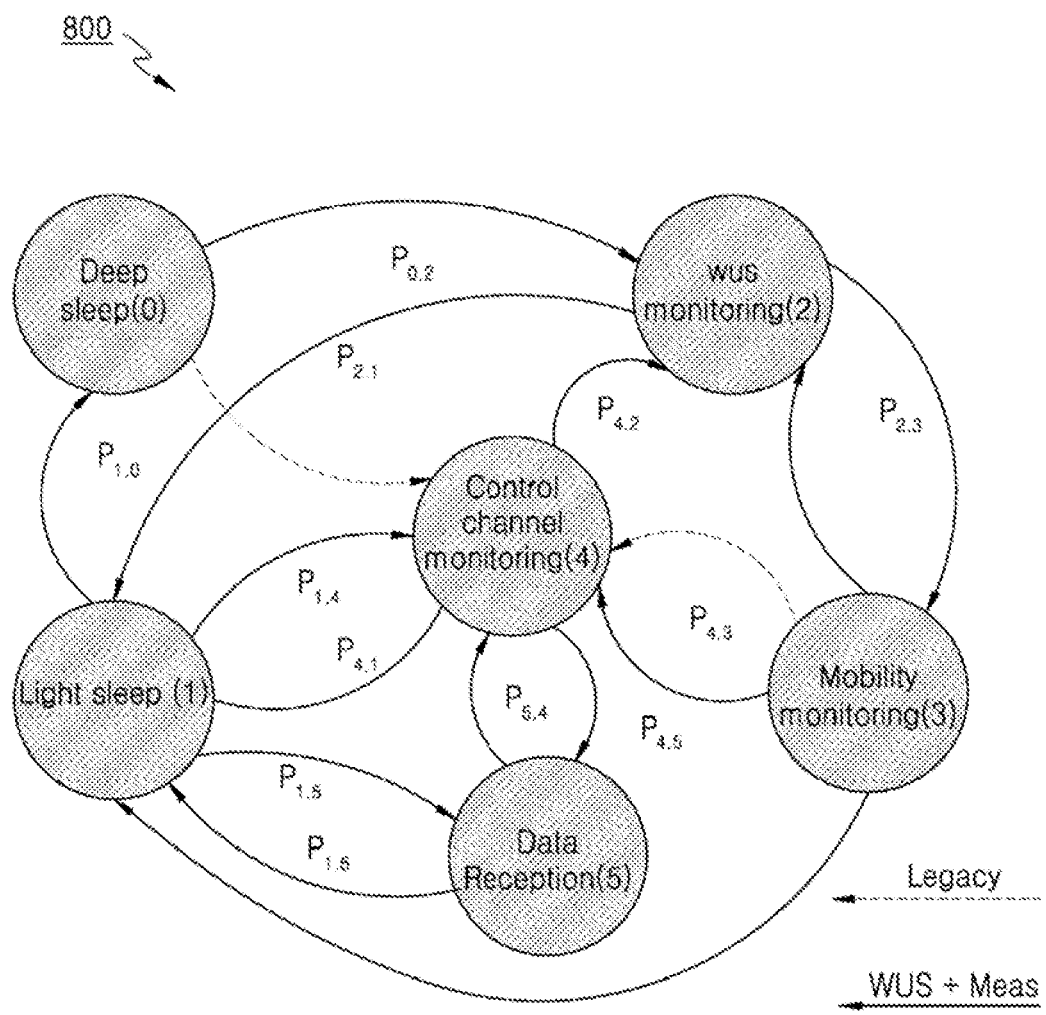
FIG. 8 illustrates a Discrete Time Markov Chain (DTMC) model for a system, according to an embodiment of the present disclosure.

FIG. 8a illustrates a Discrete Time Markov Chain (DTMC) model 800 for a system, according to an embodiment of the present disclosure and corresponds to the embodiment as referred in FIG. 2. The DTMC model is adapted to analyze the power consumption for the UE along with measurement operations as a function of mobility state and perceived signal strength. The proposed model considers UEs probabilistic transitions through different power consumption states viz. Deep sleep (S0), Light sleep (S1), WUS monitoring (S2), Mobility measurement (S3), Control channel monitoring (S4), and Data reception (S5). According to the 3GPP standard specification, a UE in the "connected state" is configured with DRX parameters from the Network. The UE stays in a very low power consuming state S0 by switching OFF the RF modules when there is no data expected for reception for a considerable duration. Another sleep state is S1, termed as Light sleep, and UE moves to this state when the sleep time is limited and it is not feasible to entirely shut down the RF circuitry. A limited shutdown results in to power saving which is significant but lesser than that in state S0.

In state S2, the UE receives a WUS (Wake-Up Signal) which indicates the presence of control channels carrying allocation for the UE. In this state (S2), power consumption is higher than S0 and S1, but still lower than that of state S4 which is when UE receives the control channels. In state S4, depending on the cell configuration and different kind of data to be received by the UE (e.g. user data, cell information, paging message etc.), the UE needs to perform blind decoding of different control channels across different search spaces and bandwidth regions. Consequently, the UE consumes higher amount of power in this state. If data reception is indicated in state S4, the UE continues to be active for the data reception (S5), where the power consumption is the highest as the UE decodes the data channels and processes the received data packets. Another high power consuming state is S3 which is when the UE performs signal strength and channel quality measurements from various serving and/or neighbouring cells and sectors, and beams measurement for the mobility management purpose.

We also show some transitions with dashed curves which are applicable only to legacy 3GPP DRX approach. For example, in legacy, the UE moves from S0 to S4 to monitor control channel whereas in enhanced approach, the UE transits from S0 to S2 to monitor WUS for finding presence of control channel.

As discussed, the UE enters into S1 state when the UE keeps its RF circuit ON. However, the UE switches OFF some of its hardware to consume lower power. S1 state can be achieved by the UE whenever there is a small offset between two major power consuming activities:

Light Sleep after completing the control channel monitoring

Light Sleep after data reception

Light Sleep after mobility measurement

Table 1 illustrates normalized power consumption per unit time by the UE in each state, according to an embodiment of the present disclosure. As would be appreciated by a person skilled in the art, Table 1 is included for providing a better understanding of the present subject and therefore, should not be construed as limiting in any way.

TABLE 1

| UE State | Power consumption per unit time (ms) |
| --- | --- |
| Deep Sleep, S0 | 1 |
| Light Sleep, S1 | 20 |
| WUS Monitoring, S2 | 50 |
| Measurement, S3 | |
| Control channel monitoring, S4 | 100 |
| Data reception, S5 | 300 |

It can be easily inferred that the overall power profile of the UE depends on the "holding time" in each of the higher power consuming states (S3, S4 and S5). In order to investigate the power profile of the UE, the probabilistic transitions of UE into different power consumption states and the holding time in each of these states are analysed. We assume Poisson distribution for data arrival (packet inter-arrival rate, $\lambda$) to the UE.

Table 2 illustrates symbol notations, according to an embodiment of the present disclosure. As would be appreciated by a person skilled in the art, Table 2 is included for providing a better understanding of the present subject and therefore, should not be construed as limiting in any way.

TABLE 2

| Symbol | Description |
| --- | --- |
| $T_{on}$ | DRX ON duration |
| $T_{in}$ | Inactivity time period |
| $T_{meas}$ | Time to Measurement occasion |
| $T_{md}$ | Measurement duration |
| $T_{ls}$ | Light sleep duration |
| $T_{ds}$ | Deep sleep duration |
| $T_{wus}$ | Time to WUS occasion |
| $T_{wd}$ | Wake-up monitoring duration |

Description of the DTMC State Transition:

To start with, let's consider that the UE is in S0 state. When entering into S0 state, the UE starts a timer with value $T_{wus}$, where $T_{wus}$ indicates the offset of WUS position in time domain. At expiry of $T_{wus}$, UE moves to S2 state (S0→S2) where it monitors WUS to check the presence of control channel. If presence of control channel is indicated in S2 state, the UE moves to S4 state to monitor control channel and starts $T_{on}$ ON-Duration timer (S2→S4). In S4 state, if the UE receives control channel information before ON-Duration timer expiry it moves to S5 state where it starts receiving data (S4→S5). The UE in S5 state starts a timer with value $T_{meas}$ and start/restart another timer with $T_{in}$. On expiry of $T_{meas}$ the UE moves to S3 state to perform mobility measurement (S5→S3). UE remains in S3 state for a period of $T_{md}$. After $T_{md}$ duration, the UE moves to S1 state and then to S0 state (S3→S1), if $T_{ia}$ has already expired. If $T_{ia}$ is still running the UE moves to S3 state for further control channel monitoring and data reception in S5 (S3→S4→S5).

In S4 state, the UE starts a timer with value $T_{meas}$. On expiry of $T_{meas}$, the UE moves to S3 state to perform mobility measurement (S4→S3). If ON-Duration timer expires before receiving any control channel information and $T_{meas}$ is not running, The UE moves to S1 state and then to S0 state (S4→S1→S0).

In S2 state, if control channel is indicated as absent, the UE starts a timer with value $T_{meas}$. On expiry of $T_{meas}$, the UE moves to S3 state to perform mobility measurement (S2→S3). If $T_{meas}$ is not running, the UE moves to S1 state and then S0 state (S2→S1→S0). In S1 state it starts a timer T1 and waits for the next activity. On expiry of T1, the UE moves into S0 state (S1→S0).

Stationary-state probabilities for different DTMC states follow:

$$\sum_{i=1}^{5} \pi_i = 1 \quad \text{Math Figure 1}$$

Transition probabilities for the UE moving to different states are given as:

Math FIG. 2

$P_{5,1} = Pr[T > T_{ia}, T < T_{meas}] = e^{-\lambda T_{ia}}(1 - e^{-\lambda T_{meas}})$ $P_{5,3} = Pr[T > T_{ia}, T < T_{meas}] = (1 - e^{-\lambda T_{ia}})e^{-\lambda T_{meas}}$ $P_{5,5} = Pr[T > T_{ia}, T < T_{meas}] = (1 - e^{-\lambda T_{ia}})(1 - e^{-\lambda T_{meas}})$ $P_{4,1} = Pr[T > T_{on}, T < T_{meas}] = e^{-\lambda T_{on}}(1 - e^{-\lambda T_{meas}})$ $P_{4,3} = Pr[T > T_{on}, T < T_{meas}] = (1 - e^{-\lambda T_{on}})e^{-\lambda T_{meas}}$ $P_{4,4} = Pr[T > T_{on}, T < T_{meas}] = (1 - e^{-\lambda T_{on}})(1 - e^{-\lambda T_{meas}})$ Stationary state probabilities for different DTMC states follow $$\sum_{i=0}^{5} \pi_i = 1 \quad \text{Math Figure 3}$$

Substituting from Equation 1, we can obtain stationary state probabilities from equation 3 as $$\pi_i = \sum_{j=0}^{5} \pi_j P_{j,i} \text{ s.t. } j \neq i \quad \text{Math Figure 4}$$

Now, we determine holding time for different states. It is straight-forward to see that holding times for state S0, S1, S2 and S3 are directly dependent on the respective timer values configured. For state S4, there is possibility of (a) no packet being received during $T_{on}$ duration, (b) a packet arrival at instant $1 \leq k < T_{on}$ which moves it to state S5 and (c) expiry of $T_{meas}$ which moves to S3 state. For state S5, (a) packet arrival at instant $1 \leq k < T_{ia}$ which restarts $T_{ia}$ timer, (b) no packet arrival until $T_{ia}$ timer expiry and UE moves to state S1 and (c) expiry of $T_{meas}$ which moves to S3 state $$H_0 = T_{ds} \quad \text{Math Figure 5}$$

$$H_1 = T_{ls}$$

$$H_2 = T_{wd}$$

$$H_3 = T_{md}$$

$$H_4 = \sum_{k=1}^{T_{on}} k Pr\{k - 1 \leq T < k\} + P_{4,1}T_{on} + P_{4,3}T_{meas}$$

$$H_5 = \sum_{k=1}^{T_{ia}} (H_5 + k) Pr\{k - 1 \leq T < k\} + P_{5,1}T_{ia} + P_{5,3}T_{meas}$$

Figure 8B:
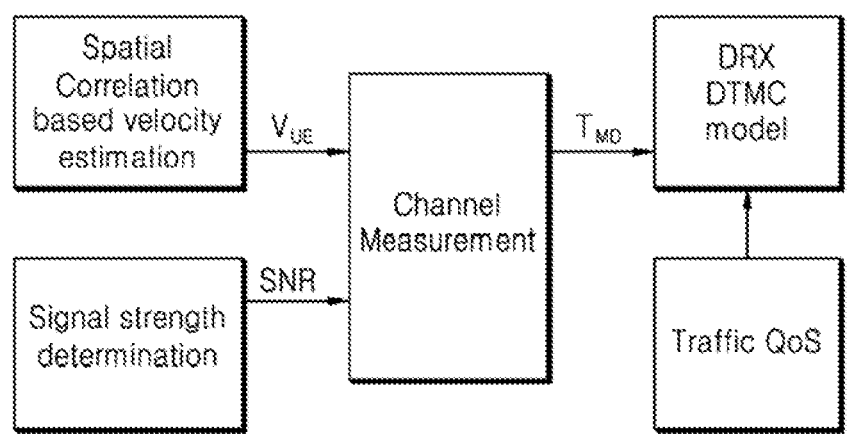

In order to achieve energy efficient measurement, the duration of measurement $T_{md}$ needs to be controlled. For such purposes, FIG. 8b depicts a proposed measurement approach accordance with an embodiment of the present subject matter. As shown in FIG. 8b, two distinct inputs are considered i.e. UE velocity estimated through a spatial-correlation approach and a determined signal strength to govern measurement control. Further, in order to evaluate the impact of the signal strength variations and UE mobility on the measurement operation and resultant power consumption, we build a Finite State Markov Chain (FSMC). Let's consider there are K finite states in FSMC $S = _{s0, s1 \ldots sk-1}$, and transition probability $P_{i,j}$ between state i and j, such that $P_{i,j} = 0$ if $|j - i| > 1$. That implies transition between adjacent states is only permitted.

Multipath propagation scenario is well represented with a Rayleigh fading channel where in the envelope of the received signal is has Rayleigh distribution. Probability distribution function of the received instantaneous SNR $\zeta$ is exponentially distributed as:

$$p(\zeta) = \frac{1}{\zeta_0} e^{\left(-\frac{\zeta}{\zeta_0}\right)} \quad \text{Math Figure 6}$$

Where is $\zeta_0=E[\zeta]$ is average SNR. Mobility of the UE leads to Doppler frequency and considering $f_d$ as maximum Doppler frequency, $f_d=v/\lambda$ where v is the speed of the UE and $\lambda$ is wavelength of signal. We determine the Level Crossing Rate (LCR) of instantaneous signal SNR as:

$$N(Th) = \sqrt{\frac{2\pi Th}{\zeta_0}} f_d e^{\left(-\frac{Th}{\zeta_0}\right)} \qquad \text{Math Figure 7}$$

LCR represents the rate at which SNR crosses a defined threshold Th, either in positive or negative direction and therefore is a measure of fading rapidity.

We partition the received signal to noise ratio (SNR) into finite intervals so as to map each of the FSMC state to a distinct range of SNR. To utilize the SNR based FSMC model for measurement control during DRX cycle, it is required that the SNR range of the FSMC state is large enough so that decision made remains valid over the DRX cycle. At the same time, it also ensures that the short term rapid variations of the SNR are contained in the same representative FSMC state and state transition is limited to adjacent FSMC state only.

It is needed to determine the average duration of the received SNR in a particular state. Let $d_k$ denote the average duration between lower threshold $Th_k$ and upper threshold $Th_{k+1}$ of a state k, when total duration is T and $d_j$ represents individual durations for signal between two thresholds.

$$d_k = \frac{\sum d_j}{T(N(Th_k) - N(Th_{k+1}))} \qquad \text{Math Figure 8}$$

$$= \frac{Pr\{Th_k < \zeta \le Th_{k+1}\}}{N(Th_k) - N(Th_{k+1})}$$

$$= \frac{e^{\left(-\frac{Th_k}{\zeta_0}\right)} - e^{\left(-\frac{Th_{k+1}}{\zeta_0}\right)}}{N(Th_k) - N(Th_{k+1})}$$

Figure 9:
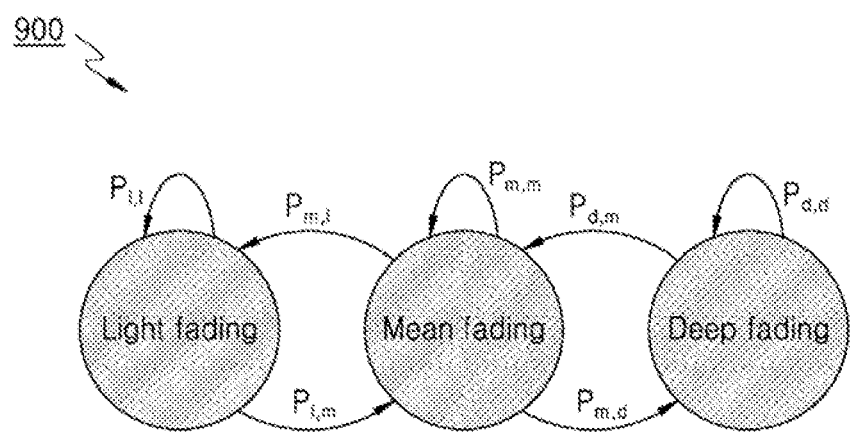
FIG. 9 illustrates a three-state Finite State Markov Chain (FSMC) model for Rayleigh Channel Fading, according to an embodiment of the present disclosure.
Figure 10:
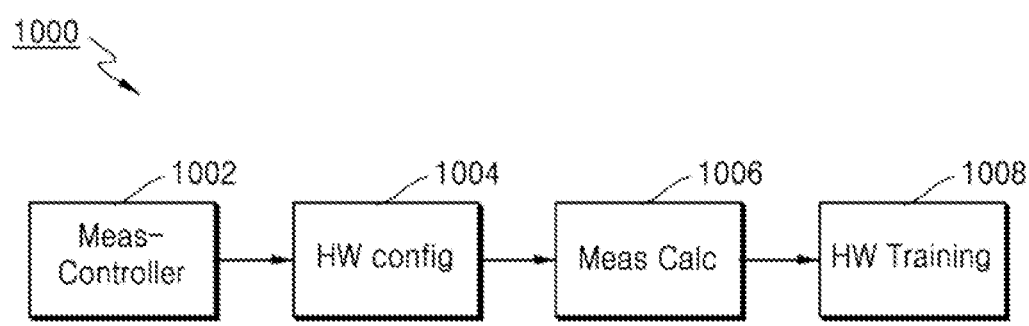
FIG. 10 illustrates a block diagram depicting functions related to measurement-related activities, to be performed by a processor of the UE, according to an embodiment of the present disclosure.

We set the thresholds for the SNR such that received SNR stays at least for the DRX cycle length i.e. $T_{DRX}$ in the same state, which implies:

$$T_{DRX} \le \frac{e^{\left(-\frac{Th_k}{\zeta_0}\right)} - e^{\left(-\frac{Th_{k+1}}{\zeta_0}\right)}}{N(Th_k) - N(Th_{k+1})} \qquad \text{Math Figure 9}$$

Where steady state probability for a given state k is:

$$p_k = e^{\left(-\frac{Th_k}{\zeta_0}\right)} - e^{\left(-\frac{Th_{k+1}}{\zeta_0}\right)} \qquad \text{Math Figure 10}$$

Figure 11:
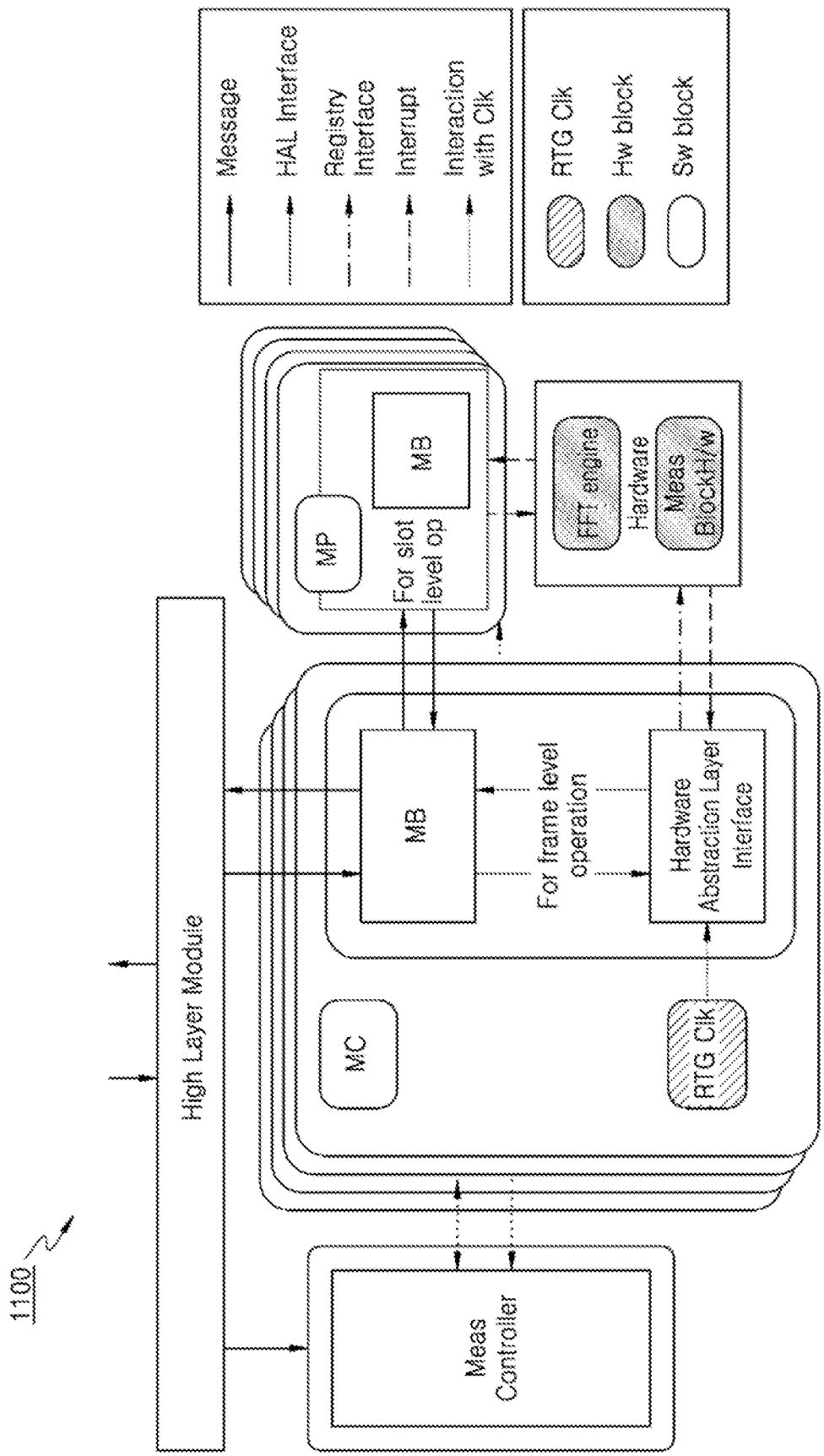
FIG. 11 illustrates a dynamic adaptable Multi-Processor Multi-Core (MPMC) architecture targeting flexible performance realization of Measurement Block (MB) for a first frequency range and a second frequency range, according to an embodiment of the present disclosure.

And cross-over probability for state k is $$cp_k = \frac{e^{\left(-\frac{Th_k}{\zeta_0}\right)} - e^{\left(-\frac{Th_{k+1}}{\zeta_0}\right)}}{\sqrt{\frac{2\pi Th_k}{\zeta_0}} f_d e^{\left(-\frac{Th_k}{\zeta_0}\right)} + \sqrt{\frac{2\pi Th_{k+1}}{\zeta_0}} f_d e^{\left(-\frac{Th_{k+1}}{\zeta_0}\right)}} \qquad \text{Math Figure 11}$$

Measurement state in our DTMC model (FIG. 8a) is portrayed as function of $\alpha$ factor dependent on UE's mobility and $\beta$ factor dependent on UE's perceived signal strengths. The rationale behind this is the achievable reliability and accuracy for measurement with controlled operations e.g. number of samples/frequencies/cells/beams to be measured is dependent on mobility and signal strength. Thereby, associated power cost for measurement is controlled with fine-tuning these scaling factors which are inversely-related to time duration over which average measured quantity changes by reliability and accuracy threshold amounts. Thereby, we adapt measurement operation moderation or scaling. Table 3 presents experimental results derived for $\alpha$ & $\beta$ factors with targeting measurements accuracy & reliability and corresponding simulation assumptions. We take 3 different SNR ranges and UE speeds and determine associated scaling factors as shown later in FIG. 9.

FIG. 9 illustrates a three-state Finite State Markov Chain (FSMC) model 900 for Rayleigh Channel Fading, according to an embodiment of the present disclosure.

Table 3 illustrates experimental results, according to an embodiment of the present disclosure. As would be appreciated by a person skilled in the art, Table 3 is included for providing a better understanding of the present subject and therefore, should not be construed as limiting in any way.

TABLE 3

| Measurement thresholds & scaling factors | Value |
| --- | --- |
| Reliability Threshold (probability of obtaining a measurement sample reliably) | 97% |
| Accuracy Threshold, Ta (delta with ideal measurement sample RSRP) | 2 dB |
| α (speed VUE = 3 kmph) | 0.48 |
| α (speed VUE = 60 kmph) | 1.00 |
| B (SNR <10dB) | 1.00 |
| β (10dB <SNR ≤20dB) | 0.67 |
| β (SNR >20dB) 0.45 | 0.45 |

Figure 12:
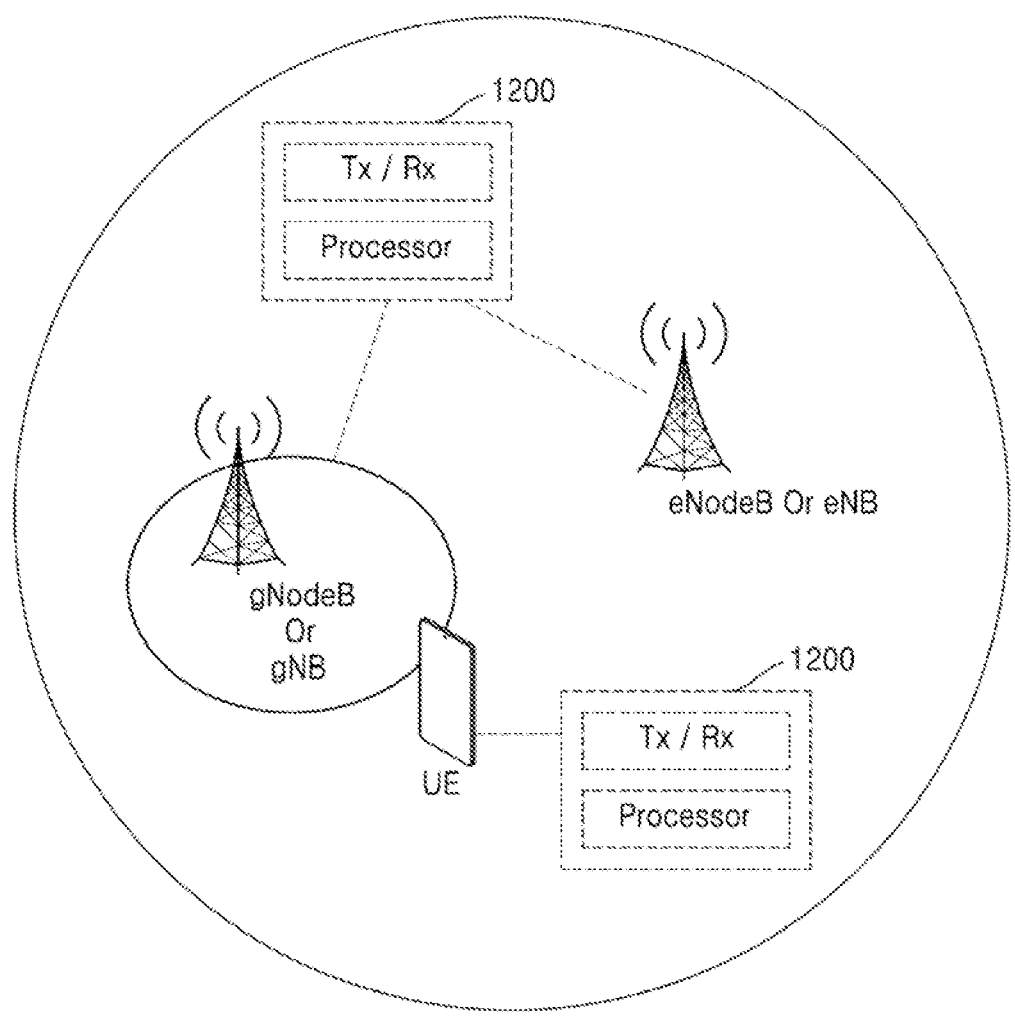
FIG. 12 illustrates an example implementation in a networking environment, in accordance with the embodiment of the present subject matter Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

It is evident that the holding time for measurement state S3 is affected with applying the Rayleigh fading channel based scaling and moderated holding time is as follows:

Math FIG. 12

$$H'_3 \alpha * \beta * T_{md}$$

We derive Energy Efficiency (EE) as the ratio of sleep states holding times over all the states holding time as:

$$EE = \frac{\pi_0 H_0 + \pi_1 H_1}{\sum_{i=0, i \ne 3}^{5} \pi_i H_i + \pi_3 H'_3} \qquad \text{Math Figure 13}$$

Where, second term in denominator pertains to moderated measurement operation.

Further, packet latency, the delay the packet suffers when UE is not in data reception state at the time of packet arrival at network, is also benefitted with measurement scaling. Latency Benefit (LB) is given as:

$$LB = \sum_{k=H'_3}^{H_3} (H_3 - k) Pr\{k - 1 \le T < k\} \qquad \text{Math Figure 14}$$

To determine the velocity of UE, we utilize the spatial autocorrelation of the delay spread. Exponentially declining function is close match to the practically observed autocorrelation pattern given as:

$$\rho_{ac}(d) = \exp\left(-\frac{d}{d_D}\right) \quad \text{Math Figure 15}$$

where d is the distance between two points of measurements for correlation and do is the reference decorrelation distance dependent on the channel environment. Further, it is possible to estimate average velocity of UE, $$V_{UE} = -\frac{d_D}{t_d}\log(\rho_{ac}(d)) \quad \text{Math Figure 16}$$

where $t_d$ is the time duration between two correlation measurements

Lastly, for effective service delivery, required QoS constraints in terms of packet delay budget (PDB), T and packet loss rate (PLR), δ are to be satisfied. Otherwise, it leads to packet drop and degradation of user service experience. Therefore, objective is to bound service latency D, such that Math FIG. 17

$$Pr[D>T] \leq \delta$$

WUS scheme in effect brings in energy efficiency at cost of increased latency impacting QoS. Hereby presented in a procedure for dynamic adaptation of measurement operation wherein measurement samples are controlled based on the signal strength and velocity based scaling while ensuring reliability and accuracy thresholds are met. When QoS constraints are not met, dynamic turn on and off of WUS is applied. Effectively, proposed approach enhances the WUS scheme and jointly improves the energy efficiency and latency-performance.

TABLE 4

Algorithm 1: Measurement Optimized Scheme

Input1: $N_{WIN}$(AverageWindow, $T_{DRX}$, TA, Meas$_{curr}$
Input2: Th$_{set}$ ⊃ Th$_0$, Th$_1$, ..., Th$_i$, ..., Th$_N$, COND = SNR, V$_{UE}$
Output: Scale$_{meas}$ <- $n_0, n_1, \ldots, n_i, \ldots, n_N, n_i \in [0, 1]$
Step1: Measurement adaptation
Scale$_{meas}$ <- 0
Meas$_{avg}$ <- (Meas$_{prev}$ + Meas$_{curr}$)/N$_{WIN}$(⊳RunningAverage)
Meas$_{avg}$ <- Meas$_{avg}$
Δ <- |Meas$_{avg}$ − Meas$_{curr}$|
If (Δ ≤ T$_A$)
  If ≤ (Th$_i$ ≤ COND M Th$_{i+1}$)
    Scale$_{meas}$ <= $n_i$
Step2: Dynamic turn of/off of WUS
If (QoS Eq. 17 holds) WUS = ON
Else WUS = OFF Overall, the present implementation illustrates UE stand-alone approach involving multiple SINR level thresholds & mobility thresholds, and scaling factors of measurements per level thresholds. As mentioned before, scaling factors are determined by reliability constraints. Dynamic turn ON/OFF WUS is accordingly rendered as per QoS performance determination approach. The following table illustrates comparisons with respect to legacy 3GPP networks:

TABLE 5

| Ser- | | Approach | |
| vice | Parameters | WUS Scheme | Meas Opt Scheme |
| --- | --- | --- | --- |
| FTP | $T_{DRX}$ = 160 ms | Latency = 65.2 ms | Latency = 58.6 ms |
| | $T_{ia}$ = 100 ms | Diff = +6.9% | Diff = −3.91% |
| IM | $T_{DRX}$ = 320 ms | Latency = 153.7 ms | Latency = 142.5 ms |
| | $T_{ia}$ = 80 ms | Diff = +5.1% | Diff = −2.55% |
| VoIP | $T_{DRX}$ = 40 ms | Latency = 15.4 ms | Latency = 13.79 ms |
| | $T_{ia}$ = 10 ms | Diff = +8.1% | Diff = −3.1% |

Latency performance w.r.t. legacy 3GPP

Realization and Performance Optimization

Performance of mobile processor platforms is evaluated in terms of MIPS; optimized solutions target lesser MIPS. New requirement with 5G emerges for meeting FR1 (Frequency Range 1) & FR2 (Frequency Range 2) measurements and beam-forming operations. As already stated in section 1, A UE processor regularly performs various measurement activities primarily MMPM and PCM. As part of MMPM, apart from regular mobility measurement on serving cell and neighbor cells, a FR2 supported UE needs to perform regular beam measurement for beam tracking and beam sweeping purpose. This imposes a requirement of different beam setting to be configured to the HW at specific time positions (slot and symbol index) along with the beam index which in turn increases the processing load of calculating slot configuration within reduced slot duration for higher frequency. As part of PCM, UE performs regular synchronization activities with the network e.g. Automatic Gain Control (AGC), Automatic Frequency Correction (AFC), Symbol Time Recovery (SIR), Coherence Time Estimation (CTE) etc. In FIG. 10 we present the block diagram of the main functions a LIE processor performs related to all these measurement activities (Measurement Block).

FIG. 10 illustrates a block diagram 1000 depicting functions related to measurement-related activities, to be performed by a processor of the UE, according to an embodiment of the present disclosure and corresponds to the embodiment as referred in FIG. 1 to FIG. 4. The Meas-Controller sub-module governs the complete measurement procedure. It is primarily responsible for controlling the exact timing for various activities e.g. configuring the HW, reading the measurement results and controlling the HW with the latest synchronization and beam information. HW config sub-module typically accesses the HW registers to configure related measurement parameters for a future time slot to perform measurement. Typically, HW generates an interrupt on completion of the measurement which is then handled by the Meas Calc sub-module to read the raw measured values from the HW and convert them into meaningful measurement and beam-sweeping/synchronization information. Finally the optional HW Training sub-module configures the HW with the latest synchronization/beam-sweeping information to tune the HW accordingly.

For FR2, slot duration reduces as low as 125 μs with higher SCS (sub-carrier spacing) of 120 KHz. This, in turn, implies completion of UE operations including all aforementioned activities within reduced slot duration. This becomes inevitable performance challenge to realize a commercial UE solution.

FIG. 11 illustrates a dynamic adaptable Multi-Processor Multi-Core (MPMC) architecture 1100 targeting flexible performance realization of Measurement Block (MB) for a first frequency range and a second frequency range, according to an embodiment of the present disclosure and corresponds to the embodiment as referred in FIG. 5. In FIG. 11, we present a dynamic adaptable Multi-Processor Multi-Core (MPMC) architecture design targeting flexible performance realization of Measurement Block (MB) for varied scenarios of FR1 and FR2.

To meet time critical requirements in FR2, realization of MB is distributed in (a) time critical H W control in Multi-Processor (MP) to cater slot-level beam-forming management, & (b) higher layer configuration and result processing in Multi-Core (MC) processor, which helps in MIPS optimization at MP.

To meet normal requirements in FR 1, MB is realized wholly in MP by merging (a)& (b) with advantage of collocated operations.

To perform non-time-critical requirements of various synchronization activities (PCM) in MP by adapting to prevalent network condition.

Meas-Controller governs UE's dynamic transition between these two realizations based on FR1/FR2 scenarios, expected processing load, number of measurement samples based on mobility and signal strength etc. It also reduces number of PCM samples by dynamically adapting to the prevalent network condition. Design decision is experimentally proven for processing gains as shown in results. We present an algorithm for determining the realization approach as follows.

TABLE 6

Algorithm 2: Measurement control: Determining realization approach

Input: MP Processing Load ($P_{LOAD}$), Number of measurement samples ($N_{MEAS}$), Frequency Range ($F_{RANGE}$)
Output: $A_{REAL}$ 0, 1, where 0 -> MP only realization and 1 -> Distributed Realization
  1:  $A_{REAL}$ <- 0
  2:  N <- $N_{MEAS}$ by Algorithm 1
  2:  Expected Measurement configuration Processing load
$P_{MEAS\_CONFIG\_LOAD}$ <- N * $P_{MEAS\_CONFIG\_LOAD\_AVG}$
  3:  Expected Measurement Result Processing Load
$P_{MEAS\_RES\_LOAD}$ <- N * $P_{MEAS\_RES\_LOAD\_AVG}$
  4:  Expected Measurement Processing load $P_{MEAS\_LOAD}$ <-
$P_{MEAS\_CONFIG\_LOAD}$ + $P_{MEAS\_RES\_LOAD}$
  5:  Expected Processing load $P_{LOAD\_EXP}$ <- $P_{LOAD}$ + $P_{MEAS\_LOAD}$
  6:  If $P_{LOAD\_EXP}$ > $P_{LOAD\_TH}$ then
      $A_{REAL}$ <- 1
      End if

TABLE 7

Algorithm 3: Measurement control: Find the period of TCM

Input: MP Processing Load ($P_{LOAD}$), Average SINR ($SINR_{AVG}$), BLER ($BLER_{AVG}$) and current CTE ($CTE_{CUR}$)
Output: The optimal time period of performing new TCM ($T_{TCM}$)
1: $T_{TCM}$ = 0
2: If $P_{LOAD}$ > $P_{LOAD\_TH}$ then
  If $CTE_{CUR}$ < $CTE_{TH}$ then
    If $SINR_{AVG}$ > $SINR_{TH}$ then
      If $BLER_{AVG}$ < $BLER_{TH}$ then
        $T_{TCM}$ = $N_{TTI}$
      End if
    End if
  End if
End if As would be gathered, the present disclosure offers a generic solution for energy efficient 5G NR mobility measurement resource allocation, which caters to all the UEs. A novel power saving signal design approach along with measurement is proposed. Further, techniques to fine-tune the measurement operations samples and frequency as a function of reliability and accuracy thresholds are presented. Moreover, the UE architecture design for 5G NR realization for mobility measurement is developed.

FIG. 12 illustrates an example implementation in a networking environment and a computing-device based implementation, in accordance with the embodiment of the present subject matter and corresponds to the embodiment as referred in FIG. 5. In an embodiment as depicted by FIG. 12, the above-mentioned features of the present disclosure can be executed by a computing-system residing in UE, eNodeB, gNodeB. Each of the UE, eNodeB, gNodeB also comprises a transceiver (Tx/Rx).

In an implementation, the UE may include a processor, a transceiver, a transmit/receive element, a speaker/microphone, a keypad, a display/touchpad, non-removable memory, removable memory, a power source, a global positioning system (GPS) chipset, and other peripherals. The processor may be a general purpose processor, a special purpose processor, a conventional processor, a digital signal processor (DSP), a plurality of microprocessors, one or more microprocessors in association with a DSP core, a controller, a microcontroller, etc.

The transmit/receive element may be configured to transmit signals to, or receive signals from, a base station (e.g., the base station) over the air interface. For example, in one embodiment, the transmit/receive element may be an antenna configured to transmit and/or receive RF signals. The transmit/receive element may include any number of transmit/receive elements. More specifically, the WTRU may employ MIMO technology. Thus, in one embodiment, the WTRU may include two or more transmit/receive elements (e.g., multiple antennas) for transmitting and receiving wireless signals over the air interface.

The transceiver may be configured to modulate the signals that are to be transmitted by the transmit/receive element and to demodulate the signals that are received by the transmit/receive element. The processor may also be coupled to the GPS chipset, which may be configured to provide location information (e.g., longitude and latitude) regarding the current location of the WTRU. In addition to, or in lieu of, the information from the GPS chipset, the WTRU may receive location information over the air interface from a base station (e.g., base stations) and/or determine its location based on the timing of the signals being received from two or more nearby base stations.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for performing radio resource management (RRM) measurements by a wireless transmit and receive unit (WTRU) in a 3rd generation partnership project (3GPP) networks to eliminate misalignment between measurement resources and a discontinuous reception (DRX) on duration, said method comprising:

providing, by a next-generation node B (gNB), a wakeup signal (WUS) prior to a DRX on duration by a time-offset based on at-least one of;
    a secondary synchronization signal (SSS) signal resource for providing the WUS at least based on one orthogonal frequency division multiplexing (OFDM) symbol;
    a synchronization signal block (SSB) signal resource at least based on four OFDM symbols; and
    one or more of channel state information reference signal (CSIRS), physical broadcast channel (PBCH) demodulation reference signal (DMRS), tracking reference signal (TRS), positioning reference signal (PRS) based signal resource,
configuring, by the gNB, a set of measurement resources concentrated in time-domain during said time offset, said measurement resources comprising one of the CSIRS, SSS, SSB, PBCH DMRS, TRS, and PRS signal resources when WUS comprises physical downlink control channel (PDCCH) downlink control information based (DCI); and
performing, by the WTRU, during said time offset, at least one of: automatic gain control (AGC), automatic frequency control (AFC), sector transmit receive (STR), and power transmit receive (PTR) tuning based on measurements of reference signals (RS), mobility based measurements and channel-tracking based on time-domain concentrated measurement resources,
wherein the WTRU is configured for:
determining the misalignment of single message transfer control (SMTC) and DRX active time and calculate an average misalignment value over a number of DRX cycles;
comparing said average misalignment value against a defined threshold value of misalignment;
calculating a preferred set of values for DRX parameters based on said value of misalignment if said value exceeds a threshold, said DRX parameters including at-least one of: DRX on duration, DRX inactivity timer, DRX offset, DRX cycle length;
reporting said set of preferred DRX parameters to gNB for causing the gNB to modify the DRX parameters for the UE and/or change measurement configurations; and
applying said new set of DRX parameters upon receipt from gNB to thereby address SMTC and DRX misalignment.

2. The method as claimed in claim 1, wherein the WUS is communicated based on a periodic reference signal configured by gNB, said WUS including at-least one of: CSIRS, PBCH DMRS, TRS, and PRS.

3. The method as claimed in claim 1, wherein the WUS is signaled through broadcast signaling by gNB; and/or is provided by a common scrambling identity in case of employment of the CSIRS signal resources for providing the WUS signal.

4. The method as claimed in claim 1, wherein the WUS is provided selectively by the gNB based on:
    receiving user equipment (UE) communicated channel conditions defined by at-least one of reference signal received power (RSRP), reference signal received quality (RSRQ), signal-to-interference plus noise ratio (SINR), mobility status;
    assessing by the gNB at least one of DRX cycles DRX-operations and uplink measurements based on said receipt of UE communication; and
    configuring the UE to skip WUS monitoring based on assessing presence of control channel monitoring at substantially every DRX cycle.

5. The method as claimed in claim 1, wherein the WTRU is configured to:
    configure UE specific measurement configuration and/or measurement resources in time domain to control total awake duration for WTRU based on at least one of:
    channel conditions and mobility states of UE;
    UE coming up after long DRX sleep; and
    UE frequently switching between stacks in dual-subscriber identification module (SIM) dual standby (DSDS) scenario;
    enable availability of samples or measurement resources near to ON-duration of UE for the WTRU to perform measurement for: AGC, AFC, STR, and PTR tuning; and mobility measurements.

6. The method as claimed in claim 1, wherein the WTRU is configured for applying a measurement validation check to enable a measurement result to meet a threshold, said threshold being derivable based on previous measurement results and expected measurement result.

7. The method as claimed in claim 1, wherein the WTRU is configured for performing pre-DRX on measurement resources for channel-tracking before a DRX on period.

8. The method as claimed in claim 1, further comprising:
    configuring an additional RS defined at least by CSIRS based power saving signal outside connected-discontinuous reception (C-DRX) on duration with monitoring periodicity associated with C-DRX cycle, wherein said configuration comprises:
    specifying one or two CSIRS symbols based measurement resources; and positioning the specified resources between the WUS and DRX on durations.

9. A method for performing radio resource management (RRM) measurements by a wireless transmit and receive unit (WTRU) in a 3rd generation partnership project (3GPP) networks to eliminate misalignment between measurement resources and a discontinuous reception (DRX) on duration, said method comprising:
    providing, by a next-generation node B (gNB), a wakeup signal (WUS) prior to a DRX on duration by a time-offset based on at-least one of:
        a secondary synchronization signal (SSS) signal resource for providing the WUS at least based on one orthogonal frequency division multiplexing (OFDM) symbol;
        a synchronization signal block (SSB) signal resource at least based on four OFDM symbols; and
        one or more of channel state information reference signal (CSIRS), physical broadcast channel (PBCH) demodulation reference signal (DMRS), tracking reference signal (TRS), positioning reference signal (PRS) based signal resource,
    configuring, by the gNB, a set of measurement resources concentrated in time-domain during said time offset, said measurement resources comprising one of the CSIRS, SSS, SSB, PBCH DMRS, TRS, and PRS signal resources when WUS comprises physical downlink control channel (PDCCH) based downlink control information (DCI); and
    performing, by the WRTU, during said time offset, at least one of: automatic gain control (AGC), automatic frequency control (AFC), sector transmit receive (STR), and power transmit receive (PTR) tuning based on measurements of reference signals (RS), mobility based measurements and channel-tracking based on time-domain concentrated measurement resources, the method further comprising:

generating a handover command message for providing information of power saving signal configuration and/or pre-DRX on measurements resources configuration to a target cell to facilitate the WTRU in performing seamless power saving and/or measurement operations.

10. A method for performing radio resource management (RRM) measurements by a wireless transmit and receive unit (WTRU) in a 3rd generation partnership project (3GPP) networks to eliminate misalignment between measurement resources and a discontinuous reception (DRX) on duration, said method comprising:

providing, by a next-generation node B (gNB), a wakeup signal (WUS) prior to a DRX on duration by a time-offset based on at-least one of:

a secondary synchronization signal (SSS) signal resource for providing the WUS at least based on one orthogonal frequency division multiplexing (OFDM) symbol;

a synchronization signal block (SSB) signal resource at least based on four OFDM symbols; and one or more of channel state information reference signal (CSIRS), physical broadcast channel (PBCH) demodulation reference signal (DMRS), tracking reference signal (TRS), positioning reference signal (PRS) based signal resource, configuring, by the gNB, a set of measurement resources concentrated in time-domain during said time offset, said measurement resources comprising one of the CSIRS, SSS, SSB, PBCH DMRS, TRS, and PRS signal resources when WUS comprises physical downlink control channel (PDCCH) based downlink control information (DCI); and performing, by the WTRU, during said time offset, at least one of: automatic gain control (AGC), automatic frequency control (AFC), sector transmit receive (STR), and power transmit receive (PTR) tuning based on measurements of reference signals (RS), mobility based measurements and channel-tracking based on time-domain concentrated measurement resources, the method further comprising configuring a UE reselection and/or handover message at providing reselection and handover priority for cells supporting power saving and measurement resources based on steps of:

configuring WTRU to maintain a cell information list and increase priority of the reselection to cells supporting power saving and/or pre-DRX on measurement resources;

configuring a gNB to increase a priority of a handover to a target cell that can implement the power saving and/or pre-DRX on measurement resources for the UE post-handover; and initiating power saving and pre-DRX on measurement request after handover for enabling a configuration of the power saving and pre-DRX on measurement resources in the target cell for a AGC, AFC, STR, and PTR tuning in the target cell.

\* \* \* \* \*